(12) United States Patent
Okutubo

(10) Patent No.: US 11,704,298 B2
(45) Date of Patent: Jul. 18, 2023

(54) MEASURING AND IMPROVING INDEX QUALITY IN A DISTRIBUTED DATA SYSTEM

(71) Applicant: Microsoft Technology Licensing, LLC, Redmond, WA (US)

(72) Inventor: Babatunde Micheal Okutubo, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 189 days.

(21) Appl. No.: 17/193,694

(22) Filed: Mar. 5, 2021

(65) Prior Publication Data

US 2022/0284004 A1    Sep. 8, 2022

(51) Int. Cl.
  *G06F 16/22* (2019.01)
  *G06F 16/215* (2019.01)
  *G06F 16/28* (2019.01)

(52) U.S. Cl.
  CPC ........ *G06F 16/2282* (2019.01); *G06F 16/215* (2019.01); *G06F 16/28* (2019.01)

(58) Field of Classification Search
  None
  See application file for complete search history.

(56) References Cited

U.S. PATENT DOCUMENTS

| | | | |
|---|---|---|---|
| 8,935,257 B1 * | 1/2015 | Vemuri | G06F 16/2386 707/741 |
| 10,135,703 B1 | 11/2018 | Gupta et al. | |
| 2014/0181056 A1 | 6/2014 | Pidduck | |
| 2016/0171047 A1 * | 6/2016 | Beisiegel | G06F 16/278 707/715 |
| 2016/0350392 A1 | 12/2016 | Rice et al. | |
| 2017/0308809 A1 * | 10/2017 | Mozes | G06F 16/212 |
| 2021/0349648 A1 * | 11/2021 | Fatemieh | G06F 16/278 |

OTHER PUBLICATIONS

"International Search Report & Written Opinion issued in PCT Application No. PCT/US22/017190", dated May 30, 2022, 11 Pages.

* cited by examiner

*Primary Examiner* — Christopher J Raab
(74) *Attorney, Agent, or Firm* — Weaver IP L.L.C.

(57) ABSTRACT

Embodiments described herein are directed to measuring and improving an index quality of a distributed data system. For example, various quality metrics are determined on a per partition basis of the distributed data system. Each of the quality metrics are indicative of a quality of a particular property of a partition. The quality metrics are aggregated to generate an overall index quality score, which provides a measure of the performance of the index. The index quality score is utilized to automatically detect an inefficiency of the index and automatically determine that certain index maintenance actions should be automatically performed to improve the performance of the index. Each quality metric may also be individually analyzed to determine which database property is affecting the performance of the index the most.

20 Claims, 13 Drawing Sheets

Generate a global data packing quality metric based at least on a first data packing metric and a second data packing metric — 902

Generate a global compaction quality metric based at least on a combination of a first compaction quality metric and a second compaction quality metric and a predetermined compression threshold parameter — 1102

Generate a global fragmentation quality metric based at least on a combination of a first fragmentation quality metric and a second fragmentation quality metric and a total number of rows in the first partition and the second partition — 1302

MEASURING AND IMPROVING INDEX QUALITY IN A DISTRIBUTED DATA SYSTEM

BACKGROUND

A distributed database is a set of interconnected databases that is distributed over one or more computer networks and/or the Internet. The databases may include tables, rows, columns, and defined relationships between these elements. A database index provides a data structure used to improve the searching of database tables in the databases. Indexes can be created for a column in a table and allow both rapid lookups and efficient ordering of access to records in the indexed tables. Thus, an index provides advantages to applications accessing data within a database, such as quick access to data in database tables. However, as the data is modified over time (e.g., via insertions, deletions, etc.) the effectiveness of the index may degrade if it is not properly maintained.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Methods, systems, apparatuses, and computer-readable storage mediums described herein are configured to measure and improve an index quality of a distributed data system. For example, various quality metrics are determined on a per partition basis of the distributed data system. Each of the quality metrics are indicative of a quality of a particular property of a partition. For instance, the quality metrics may measure how well data is distributed between the different partitions and/or how well data is clustered, packed, compressed and/or fragmented within a particular partition. The quality metrics may be aggregated to generate an overall index quality score, which provides a measure of the performance of the index. The index quality score may be utilized to automatically detect an inefficiency of the index and automatically determine that certain index maintenance actions should be performed to improve the performance of the index. For instance, if an inefficiency is detected, actions may be automatically performed to alter a manner in which data of the distributed data system is stored. Each quality metric may also be individually analyzed to determine which database property is affecting the performance of the index the most.

Further features and advantages, as well as the structure and operation of various example embodiments, are described in detail below with reference to the accompanying drawings. It is noted that the example implementations are not limited to the specific embodiments described herein. Such example embodiments are presented herein for illustrative purposes only. Additional implementations will be apparent to persons skilled in the relevant art(s) based on the teachings contained herein.

BRIEF DESCRIPTION OF THE DRAWINGS/FIGURES

The accompanying drawings, which are incorporated herein and form a part of the specification, illustrate example embodiments of the present application and, together with the description, further serve to explain the principles of the example embodiments and to enable a person skilled in the pertinent art to make and use the example embodiments.

FIG. 9 shows a flowchart of a method for determining a global data packing quality metric in accordance with an example embodiment.

FIG. 11 shows a flowchart of a method for determining a global compaction quality metric in accordance with an example embodiment.

FIG. 13 shows a flowchart of a method for determining a global fragmentation quality metric in accordance with an example embodiment.

Figure 1:
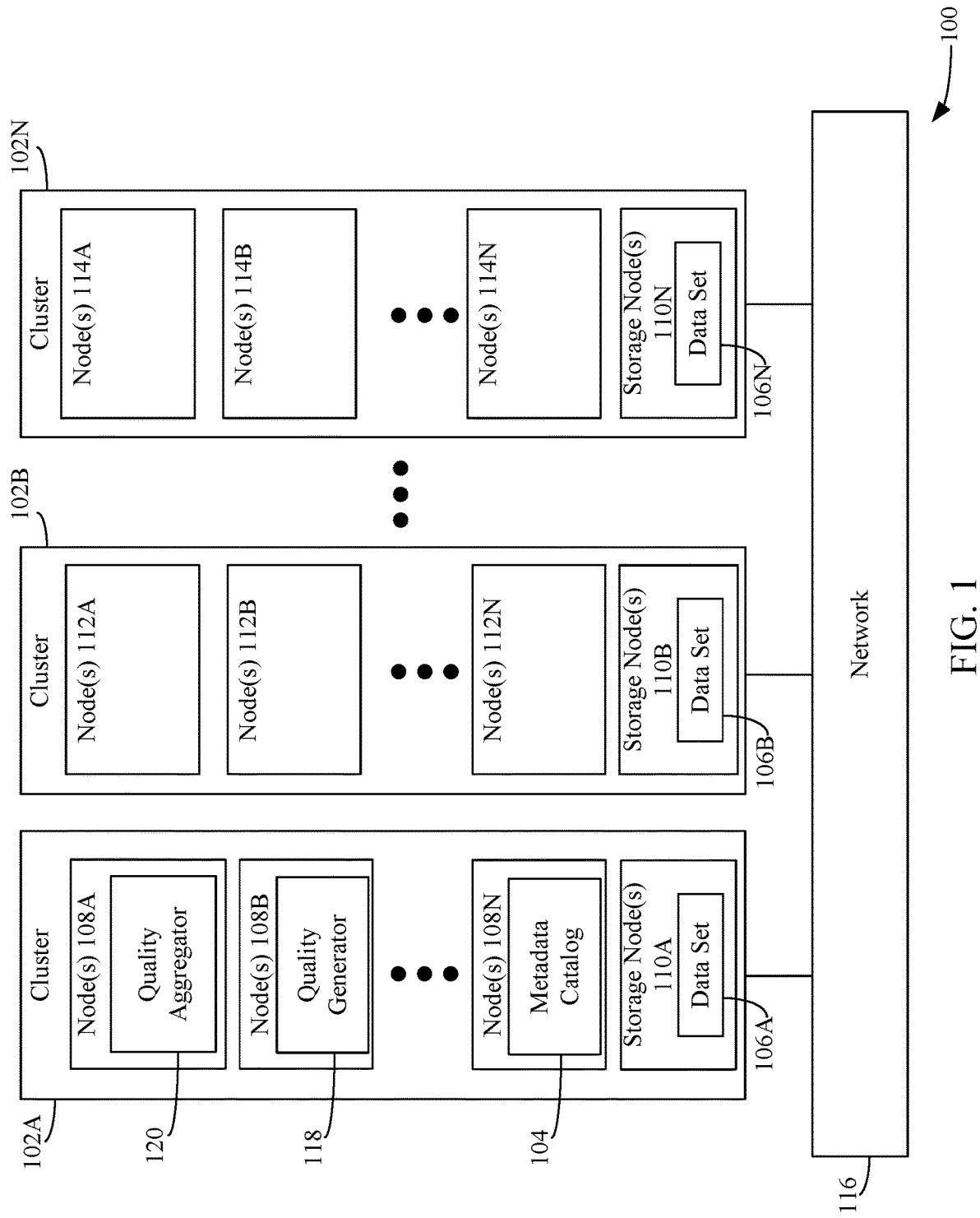
FIG. 1 shows a block diagram of an example network-based computing system configured to measure and improve an index quality of a distributed data system in accordance with an example embodiment.

The features and advantages of the implementations described herein will become more apparent from the detailed description set forth below when taken in conjunction with the drawings, in which like reference characters identify corresponding elements throughout. In the drawings, like reference numbers generally indicate identical, functionally similar, and/or structurally similar elements. The drawing in which an element first appears is indicated by the leftmost digit(s) in the corresponding reference number.

DETAILED DESCRIPTION

I. Introduction

The present specification and accompanying drawings disclose numerous example implementations. The scope of the present application is not limited to the disclosed implementations, but also encompasses combinations of the disclosed implementations, as well as modifications to the disclosed implementations. References in the specification to "one implementation," "an implementation," "an example embodiment," "example implementation," or the like, indicate that the implementation described may include a particular feature, structure, or characteristic, but every implementation may not necessarily include the particular feature, structure, or characteristic. Moreover, such phrases are not necessarily referring to the same implementation. Further, when a particular feature, structure, or characteristic is described in connection with an implementation, it is submitted that it is within the knowledge of persons skilled in the relevant art(s) to implement such feature, structure, or characteristic in connection with other implementations whether or not explicitly described.

In the discussion, unless otherwise stated, adjectives such as "substantially" and "about" modifying a condition or relationship characteristic of a feature or features of an implementation of the disclosure, should be understood to mean that the condition or characteristic is defined to within tolerances that are acceptable for operation of the implementation for an application for which it is intended.

Furthermore, it should be understood that spatial descriptions (e.g., "above," "below," "up," "left," "right," "down," "top," "bottom," "vertical," "horizontal," etc.) used herein are for purposes of illustration only, and that practical implementations of the structures described herein can be spatially arranged in any orientation or manner.

Numerous example embodiments are described as follows. It is noted that any section/subsection headings provided herein are not intended to be limiting. Implementations are described throughout this document, and any type of implementation may be included under any section/subsection. Furthermore, implementations disclosed in any section/subsection may be combined with any other implementations described in the same section/subsection and/or a different section/subsection in any manner.

II. Example Implementations

Embodiments described herein are directed to measuring and improving an index quality of a distributed data system. For example, various quality metrics are determined on a per partition basis of the distributed data system. Each of the quality metrics are indicative of a quality of a particular property of a partition. For instance, the quality metrics may measure how well data is distributed between the different partitions and/or how well data is clustered, packed, compressed and/or fragmented within a particular partition. The quality metrics may be aggregated to generate an overall index quality score, which provides a measure of the performance of the index. The index quality score may be utilized to automatically detect an inefficiency of the index and automatically determine that certain index maintenance actions should be performed to improve the performance of the index. For instance, if an inefficiency is detected, actions may be automatically performed to alter a manner in which data of the distributed data system is stored. Each quality metric may also be individually analyzed to determine which database property is affecting the performance of the index the most.

The foregoing techniques advantageously improve the performance of a distributed data system by ensuring that data is laid out and stored in the most efficient way possible. This advantageously reduces the amount of storage required to store the data and improves query performance, as the number of data files that are searched during a query is reduced. Accordingly, the foregoing techniques reduce the amount of various compute resources required to search for data (e.g., processing cycles, the number of input/output (I/O) transactions, power, etc.).

In addition, the quality metrics determined for each partition is performed in a parallel manner. For instance, each partition may be associated with a respective metadata catalog, which stores metadata associated for a particular partition. Metadata from each metadata catalog may be retrieved and analyzed to determine quality metrics by a node local to the partition. This advantageously allows the quality metrics for the different partitions to be generated in parallel (as opposed to a remote central entity individually querying each metadata catalog and then determining the overall index score), leading to fast metrics generation.

For example, FIG. 1 shows a block diagram of an example network-based computing system 100 configured to measure and improve the index quality of a distributed data system, according to an example embodiment. As shown in FIG. 1, system 100 includes a plurality of clusters 102A, 102B and 102N. Each of clusters 102A, 102B and 102N are communicatively coupled to each other via network 116. Network 116 may comprise one or more networks such as local area networks (LANs), wide area networks (WANs), enterprise networks, the Internet, etc., and may include one or more of wired and/or wireless portions.

Clusters 102A, 102B and 102N may form a network-accessible server set (e.g., a cloud-based environment). Each of clusters 102A, 102B and 102N may comprise a group of one or more nodes (also referred to as compute nodes) and/or a group of one or more storage nodes. For example, as shown in FIG. 1, cluster 102A includes nodes 108A-108N and/or one or more storage nodes 110A, cluster 102B includes nodes 112A-112N and/or storage node(s) 110B, and cluster 102N includes nodes 114A-114N and/or storage node(s) 110N. Each of nodes 108A-108N, 112A-112N and/or 114A-114N are accessible via network 116 (e.g., in a "cloud-based" embodiment) to build, deploy, and manage applications and services. Each of storage node(s) 110A-110N comprises a plurality of physical storage disks that are accessible via network 116 and is configured to store data associated with the applications and services managed by nodes 108A-108N, 112A-112N, and/or 114A-114N.

As shown in FIG. 1, storage node(s) 110A-110N comprise data sets 106A-106N, respectively. Each of data sets 106A-106N include databases and/or the like, in embodiments, which may be very large data sets such as for "Big Data" analytics and/or data warehousing. It is contemplated herein that one or more of data sets 106A-106N are to the order of petabytes, or more, in embodiments. Data sets 106A-106N may be logically represented as structured, relational data, organized as rows of tables, having columns for the data. The data of data sets 106A-106N may be stored in one or more data files. Each of data sets 106A-106N may be partitioned into a plurality of partitions based on a partitioning key, which may comprise one or more columns that determine the partition where each row is stored. Each partition may be stored on a different storage node of storage nodes 110A-110N, although the embodiments described herein are not so limited.

In accordance with an embodiment, data sets 106A-106N are part of the same database that is distributed among storage node(s) 110A-110N (i.e., data sets 106A-106N are part of a distributed database system). In accordance with such an embodiment, each of the data objects may be immutable (i.e., the data objects are not modifiable). Any requested modifications to a given data object are recorded and/or stored as a separate data object, where a copy of the data object (for which a modification is requested) is generated and the modifications are applied to the copy.

In an embodiment, one or more of clusters 102A, 102B and 102N may be co-located (e.g., housed in one or more nearby buildings with associated components such as backup power supplies, redundant data communications, environmental controls, etc.) to form a datacenter, or may be arranged in other manners. Accordingly, in an embodiment, one or more of clusters 102A, 102B and 102N may be a datacenter in a distributed collection of datacenters.

Each of node(s) 108A-108N, 112A-112N and 114A-114N may comprise one or more server computers, server systems, and/or computing devices. Each of node(s) 108A-108N, 112A-112N and 114A-114N may be configured to execute one or more software applications (or "applications") and/or services and/or manage hardware resources (e.g., processors, memory, etc.), which may be utilized by users (e.g., customers) of the network-accessible server set. Node(s) 108A-108N, 112A-112N and 114A-114N may also be configured for specific uses. For example, as shown in FIG. 1, node(s) 108N may be configured to store a metadata catalog 104, node(s) 108B may be configured to execute a quality generator 118, and node(s) 108A may be configured to execute a quality aggregator 120.

Any of node(s) 108A-108N, 112A-112N, and/or 114A-114N may be configured to execute a database server application (not shown). The database server application may execute on a node that acts as the query endpoint for incoming queries, to produce a distributed plan for an incoming query, and to divide work for query processing among one or more of compute nodes 108A-108N, nodes 112A-112N, and/or nodes 114A-114N. That is, according to embodiments, such a node configured to transform an incoming query into a set of queries that are run against each distribution of a data set in parallel via one or more of nodes 108A-108N, nodes 112A-112N, and/or nodes 114A-114N. The database server application may be any database server application, including, but not limited to Microsoft® Azure SQL Database™ published by Microsoft® Corporation of Redmond, Washington. The database server application is configured to execute statements to create, modify, and delete one or more data objects of tables of data, indexes, and relationships in data set(s) 106A-106N, e.g., based on an incoming query. Queries may be user-initiated or automatically generated by one or more background processes. Such queries may be configured to add data file(s), merge data file(s) into a larger data file, re-organize (or re-cluster) data file(s) (e.g., based on a commonality of data file(s)) within a particular set of data file, delete data file(s) (e.g., via a garbage collection process that periodically deletes unwanted or obsolete data), etc.

Each partition of data sets 106A-106N may be associated with a respective instance of metadata catalog 104. Metadata catalog 104 stores the metadata for the data maintained by a respective partition of data set(s) 106A-106N. The metadata may be stored in a machine-readable format (e.g., in a format that can be processed by a computer without human invention). Examples of metadata stored by metadata catalog 104 include, but are not limited to, a number of rows in each file of each partition, a number of rows marked for deletion in each file in each partition, a number of uncompressed rows in each file in each partition, a number of active data files in each partition, an indication of numbers of data files of each partition that include a row having a particular value of a particular clustering key, a number of data files in each partition that store values for multiple clustering keys, etc. Storing such metadata advantageously negates any need to perform complex queries directly to the underlying database table for such data, thereby saving valuable compute resources (e.g., processing cycles, the number of input/output (I/O) transactions, power, etc.). Metadata catalog 104 may be updated with such metadata as each query to data sets 106A-106N completes.

Data sets 106A-106N may be associated with an index that is utilized to efficiently retrieve records from data files of data sets 106A-106N based on one or more attributes on which the indexing has been done (e.g., particular columns, partitioning keys, clustering keys, etc.). The index may comprise one or more data structures, such as index table(s). The manner in which rows are stored via the data files of data sets 106A-106N may affect the quality of the index. For instance, if the rows are organized in an inefficient manner, the performance of the index utilized to retrieve records from such rows may be impacted.

Quality generator 118 and quality aggregator 120 may be utilized to determine whether an inefficiency exists with respect to the index. For instance, an instance of quality generator 118 may execute on a respective node of node(s) 108N. Each instance of quality generator 118 may be configured to generate various quality metrics for a particular partition based on metadata stored for that partition. This advantageously allows the quality metrics to be generated in parallel, leading to fast metrics generation. Each instance of quality generator 118 may obtain the metadata for a particular partition from an instance of metadata catalog 104 corresponding to that partition. Each quality metric generated for a particular partition (also referred to as a "local quality metric") is indicative of a quality of a particular property of that partition. Examples of properties include, but are not limited to, a partitioning (or data distribution) property, a clustering property, a data packing property, a compaction property and/or a fragmentation property. Each instance of quality generator 118 provides quality metrics generated thereby to metadata aggregator 120. Additional details regarding the generation of the various quality metrics are described below in Subsections A-E.

The metadata may also be utilized to generate an estimate of an amount of work required to improve the property (also referred herein as a "unit of work"). The units of work may be determined by quality generator 118 and/or quality aggregator 120. Additional details regarding the generation of the various units of work are described below in Subsections A-E.

Quality aggregator 120 is configured to aggregate (or combine) the per partition quality metrics received from each quality generator 118 to generate a global quality metric for a particular database table. The global quality metric is indicative of the performance of an index of the database system and is also referred herein as the overall index quality. The global quality metric may be utilized, for example, by an index management system (not shown), to detect an inefficiency with respect to the index of the database system. For instance, the index management system may determine whether the global quality metric meets a condition with respect to a predetermined threshold (for instance, it may determine whether the global quality metric is below a predetermined threshold). In response to determining that the global quality metric meets a condition with respect to the predetermined threshold, the index management system may perform an action to alter a manner in which data is stored by the database table in order to reduce or eliminate the inefficiency (i.e., to improve the index).

For example, the index management system may determine which of the local quality metrics is the lowest and perform an action to improve that particular local quality metric. In another example, the index management system may determine which of the units of work is the lowest and perform an action to improve the corresponding local quality metric. This way, the overhead to remediate the inefficiency will be relatively lower. It is noted that the index management system may utilize other criteria to determine whether or not to perform an action to remediate a particular inefficiency attributed to particular local quality metric.

The global quality metric may be provided to a client (e.g., a database administrator) via a graphical user interface (GUI). In certain embodiments, the quality metrics may be provide per partition quality metrics. In this case, no aggregation would be performed by quality aggregator 120. Quality aggregator 120 may also aggregate the determined unit of work generated by each instance of quality generator 118 to generate a global unit of work for a particular database table. Alternatively, each of the determined units of work may be provided per partition and no aggregation would be performed by quality aggregator 120.

It is noted that instances of database metadata catalog 104, quality generator 118, and/or quality aggregator 120 may be executing on other node(s) (e.g., node(s) 112A-112N and/or node(s) 114A-114N) in lieu of or in addition to node(s) 108A-108N, respectively.

Figure 2:
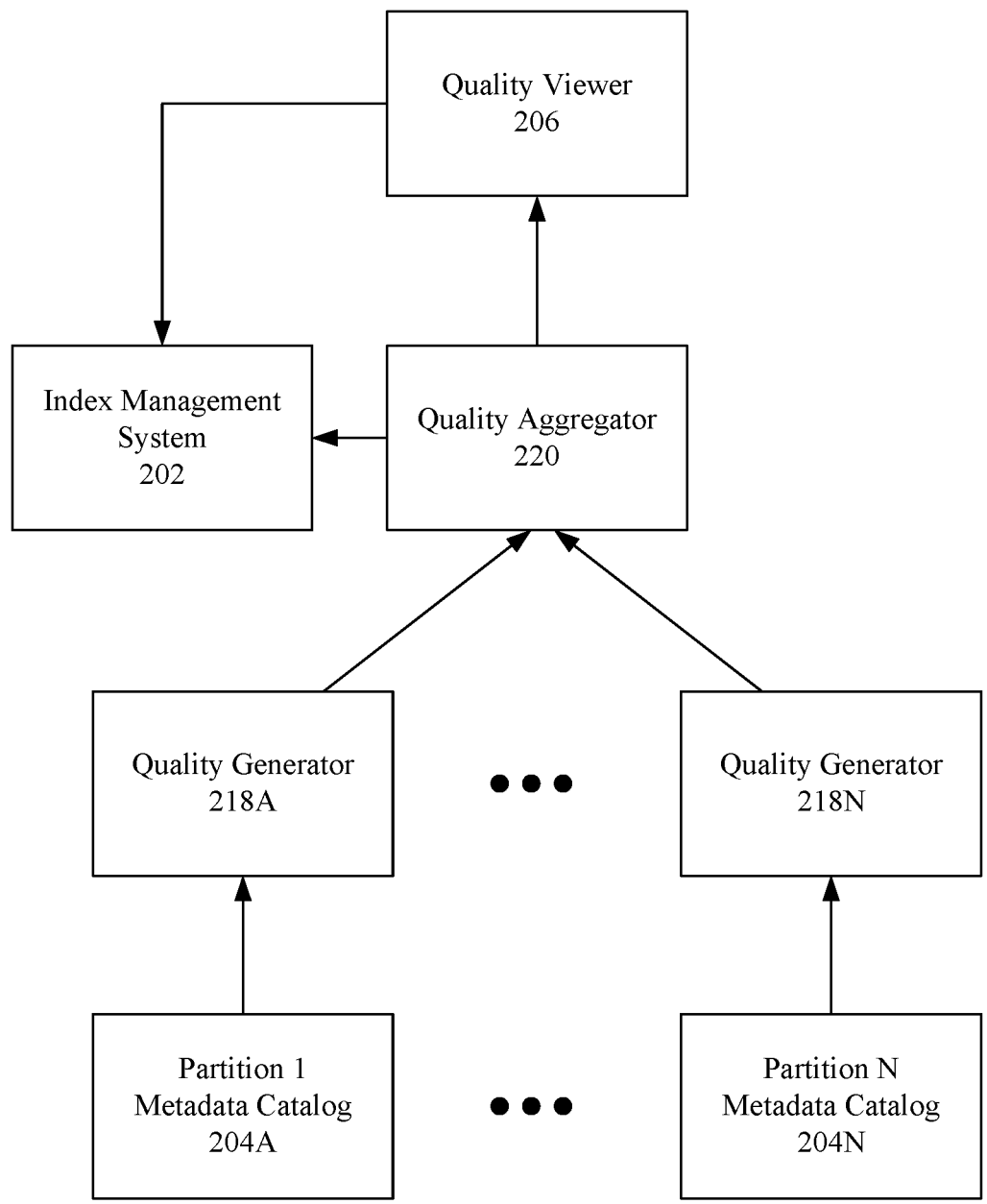
FIG. 2 depicts a block diagram of a system for measuring and improving an index quality of a distributed data system in accordance with an example embodiment.

FIG. 2 depicts a block diagram of a system 200 for measuring and improving the index quality of a distributed data system in accordance with an example embodiment. As shown in FIG. 2, system 200 comprises an index management system 202, metadata catalogs 204A-204N, quality viewer 206, quality generators 218A-218N, and a quality aggregator 220. Metadata catalogs 204A-204N are examples of metadata catalog 104, as described above with reference to FIG. 1. Quality generators 218A-218N are examples of quality generator 118, as described above with reference to FIG. 1. Quality aggregator 220 is an example of quality aggregator 120, as described above with reference to FIG. 1. It is noted that while quality aggregator 220, index management system 202 and/or quality viewer 206 are shown as being separate applications, the embodiments described herein are not so limited. For example, any of quality aggregator 220, index management system 202 and/or quality viewer 206 may be incorporated together into a single application.

Each of metadata catalogs 204A-204N stores metadata for a respective partition of a database table. For instance, metadata catalog 204A stores metadata for a first partition of a database table, and metadata catalog 204N stores metadata for an Nth partition of the database. Each of metadata catalogs 204A-204N may be stored on a respective node of node(s) 108A-108N, 112A-112, and/or 114A-114N, although the embodiments described herein are not so limited. For instance, metadata catalogs 204A-204N may be stored on the same node. Each of quality generators 218A-218N, quality aggregator 220, index management system 202, and quality viewer 206 may execute on a respective node of node(s) 108A-108N, 112A-112, and/or 114A-114N, although the embodiments described herein are not so limited. For instance, some or all of each of quality generators 218A-218N, quality aggregator 220, index management system 202, and quality viewer 206 may execute on the same node.

Quality generator 218A may be configured to generate various local quality metrics (a partitioning (or data distribution) quality metric, a clustering quality metric, a data packing quality metric, a compaction quality metric and/or a fragmentation quality metric) for the first partition based on metadata retrieved from metadata catalog 204A. Quality generator 218N may be configured to generate various local quality metrics for the Nth partition based on metadata retrieved from metadata catalog 204N. Quality generator 218A may be further configured to, for each quality metric generated for the first partition, generate the unit of work required to improve the property to which the metric corresponds. Quality generator 218N may be further configured to, for each quality metric generated for the Nth partition, generate the unit of work required to improve the property to which the metric corresponds. Quality generator 218A provides the quality metrics and units of work generated thereby to quality aggregator 220, and quality generator 218N provides the quality metrics and units of work generated thereby to quality aggregator 220.

Quality aggregator 220 is configured to generate global quality metrics for different index properties based on the local quality metrics received from each of quality generators 218A-218N. Quality aggregator 220 may also generate global units of work representative of improving a particular index property based on the local quality metrics. Quality aggregator 220 may aggregate the global quality metrics to generate an overall index quality score and may aggregate the units of work to generate an overall unit of work required to improve the performance of the index. The index quality score and the overall unit of work may be provided to index management system 202 and/or quality viewer 206.

Quality viewer 206 may display, for example, via a GUI, the overall index score and the overall unit of work. A user of the GUI (e.g., a database administrator) may determine whether an action should be performed with respect to the database table in order to improve index performance based on the overall index score and/or the overall unit of work. For example, a user may desire to alter the manner in which the database table is stored in an effort to improve the index performance. In such an example, the user, using the GUI, may issue a command to index management system 202 that causes index management system 202 to perform an action that alters the manner in which the database table is stored. In certain embodiments, in addition to or in lieu of displaying the overall index quality score and/or the overall unit of work, quality viewer 206 may individually display each determined quality metric and/or unit of work for a particular index property.

Examples of actions include, but are not limited to, determining a new partitioning key and causing the database table to be partitioned in accordance with the new partitioning key, re-clustering one or more data files of a particular partition, merging data files of a particular partition, compressing uncompressed rows of data files of a particular partition, merging active rows of different data files of a particular partition together, etc.

Index management system 202 may be configured to automatically perform an action to improve index performance based on the overall index quality and/or the overall unit of work. For instance, index management system 202 may determine whether the overall index quality score meets a condition with respect to a predetermined threshold (for instance, it may determine whether the overall index quality score is below a predetermined threshold). In response to determining that the overall index quality score meets a condition with respect to the predetermined threshold, index management system 202 may perform an action to alter a manner in which data is stored by the database table in order to reduce or eliminate the inefficiency (i.e., to improve the index).

For example, index management system 202 may determine which of the local quality metrics is the lowest and perform an action to improve that particular local quality metric. In another example, index management system 202 may determine which of the units of work is the lowest and perform an action to improve the corresponding local quality metric. This way, the overhead to remediate the inefficiency will be relatively lower. It is noted that index management system 202 may utilize other criteria to determine whether or not to perform an action to remediate a particular inefficiency attributed to particular local quality metric.

Figure 3:
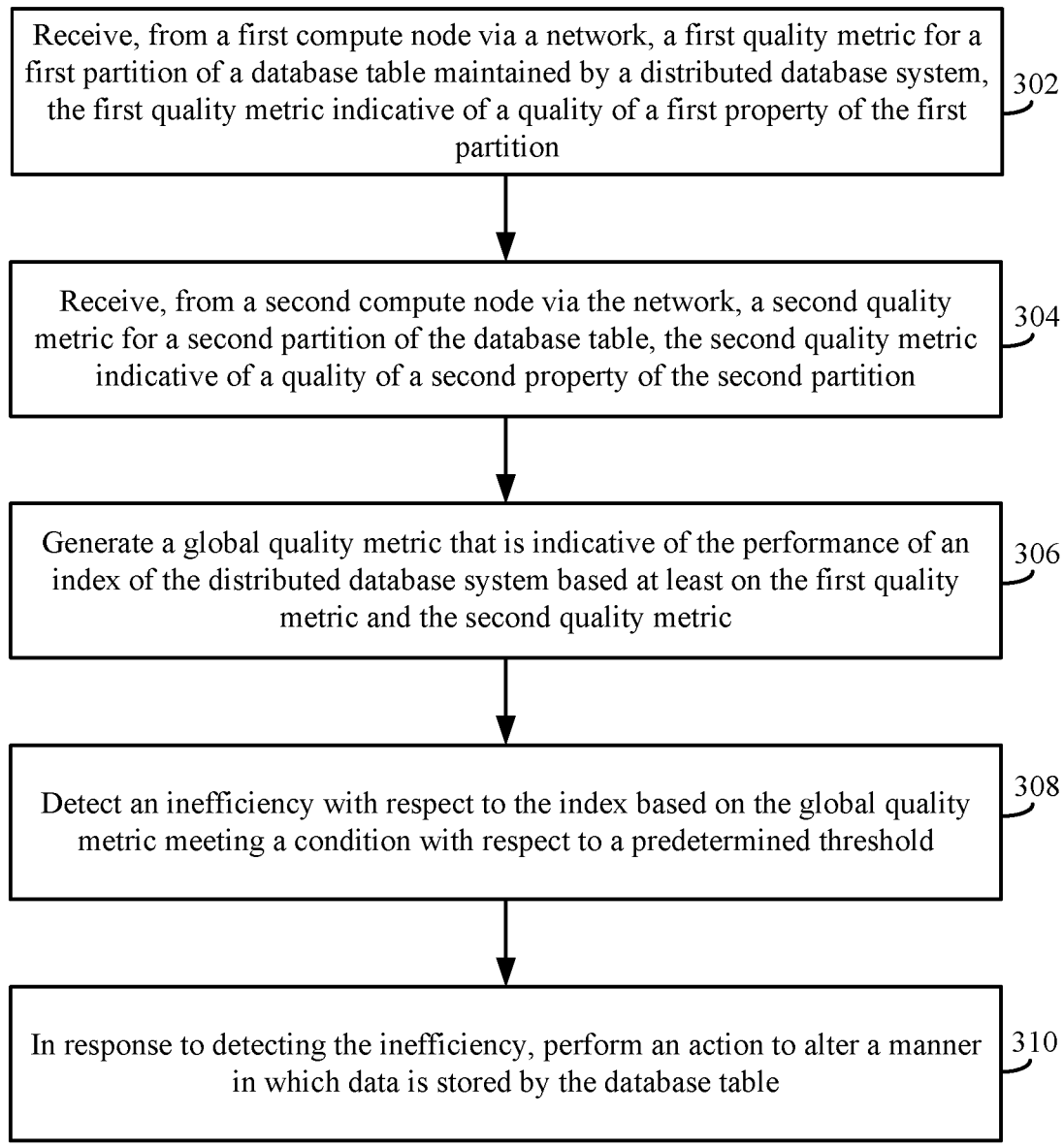
FIG. 3 shows a flowchart of a method for detecting and improving an inefficiency of an index in accordance with an example embodiment.

Accordingly, an inefficiency of an index may be detected and improved in many ways. For example, FIG. 3 shows a flowchart 300 of a method for detecting and improving an inefficiency of an index in accordance with an example embodiment. In an embodiment, flowchart 300 may be implemented by system 200 shown in FIG. 2, although the method is not limited to that implementation. Accordingly, flowchart 300 will be described with continued reference to FIG. 2. Other structural and operational embodiments will be apparent to persons skilled in the relevant art(s) based on the discussion regarding flowchart 300 and system 200 of FIG. 2.

Flowchart 300 begins with step 302. In step 302, a first quality metric is received, from a first compute node via a network, for a first partition of a database table maintained by a distributed database system. The first quality metric is indicative of a quality of a first property of the first partition. For example, with reference to FIG. 2, quality aggregator 220 may receive a first quality metric from quality generator 218A, which may execute on a compute node (e.g., a node of node(s) 108B, as shown in FIG. 1). The first quality metric may be received via a network (e.g., network 116, as shown in FIG. 1) via which quality generator 218A and quality aggregator 220 are communicatively coupled. The first quality metric may be indicative of a quality of a first property of the first partition.

Examples of properties include, but are not limited to, a partitioning (or data distribution) property, a clustering property, a data packing property, a compaction property and/or a fragmentation property.

At step 304, a second quality metric is received, from a second compute node via the network, for a second partition of the database table. The second quality metric is indicative of a quality of a second property of the second partition. For example, with reference to FIG. 2, quality aggregator 220 may receive a second quality metric from quality generator 218N, which may execute on another compute node (e.g., another node of node(s) 108B, as shown in FIG. 1). The second quality metric may be received via a network (e.g., network 116, as shown in FIG. 1) via which quality generator 218N and quality aggregator 220 are communicatively coupled. The second quality metric may be indicative of a quality of a second property of the Nth partition.

At step 306, a global quality metric is generated that is indicative of the performance of an index of the distributed database system based at least on the first quality metric and the second quality metric. For example, with reference to FIG. 2, quality aggregator 220 may be configured to generate a global quality metric that is indicative of the performance of an index of the distributed database system based at least on the first quality metric and the second quality metric.

At step 308, an inefficiency is detected with respect to the index based on the global quality metric meeting a condition with respect to a predetermined threshold. For example, with reference to FIG. 2, index management system 202 may detect an inefficiency with respect to the index based on the global quality metric meeting a condition with respect to a predetermined threshold.

At step 310, in response to detecting the inefficiency, an action is performed to alter a manner in which data is stored by the database table. For example, with reference to FIG. 2, index management system 202, in response to detecting the inefficiency, may perform an action to alter a manner in which data is stored by the database table.

Examples of actions include, but are not limited to, determining a new partitioning key and causing the database table to be partitioned in accordance with the new partitioning key, re-clustering one or more data files of a particular partition, merging data files of a particular partition, compressing uncompressed rows of data files of a particular partition, merging active rows of different data files of a particular partition together, etc. Additional details regarding the quality metrics and units of work generated by quality generators 218A-218N and/or quality aggregator 220 and the actions performed by index management system 202 are described below with reference to Subsections A-E.

A. Partitioning Quality Metric

Distributed data systems divide large scale data into multiple partitions. In a relational system, one way to partition a table is to select a partitioning key (column), used to divide the rows into different partitions. Data having the same partitioning key are in the same partition. Partitioning helps with scalability and faster query performance. This benefit is best gained when the data is evenly partitioned and with little to no skew. This allows an even amount of data processing across each partition. When there is a skew, large partitions may take longer to process than compared to smaller partitions. This is an important quality metric to measure in a distributed data system, as it affects query performance. Measuring this involves looking at how data (rows) are being distributed across partitions of the data. The quality is good when the data is evenly distributed (even number of rows) and bad when it is skewed.

Figure 4:
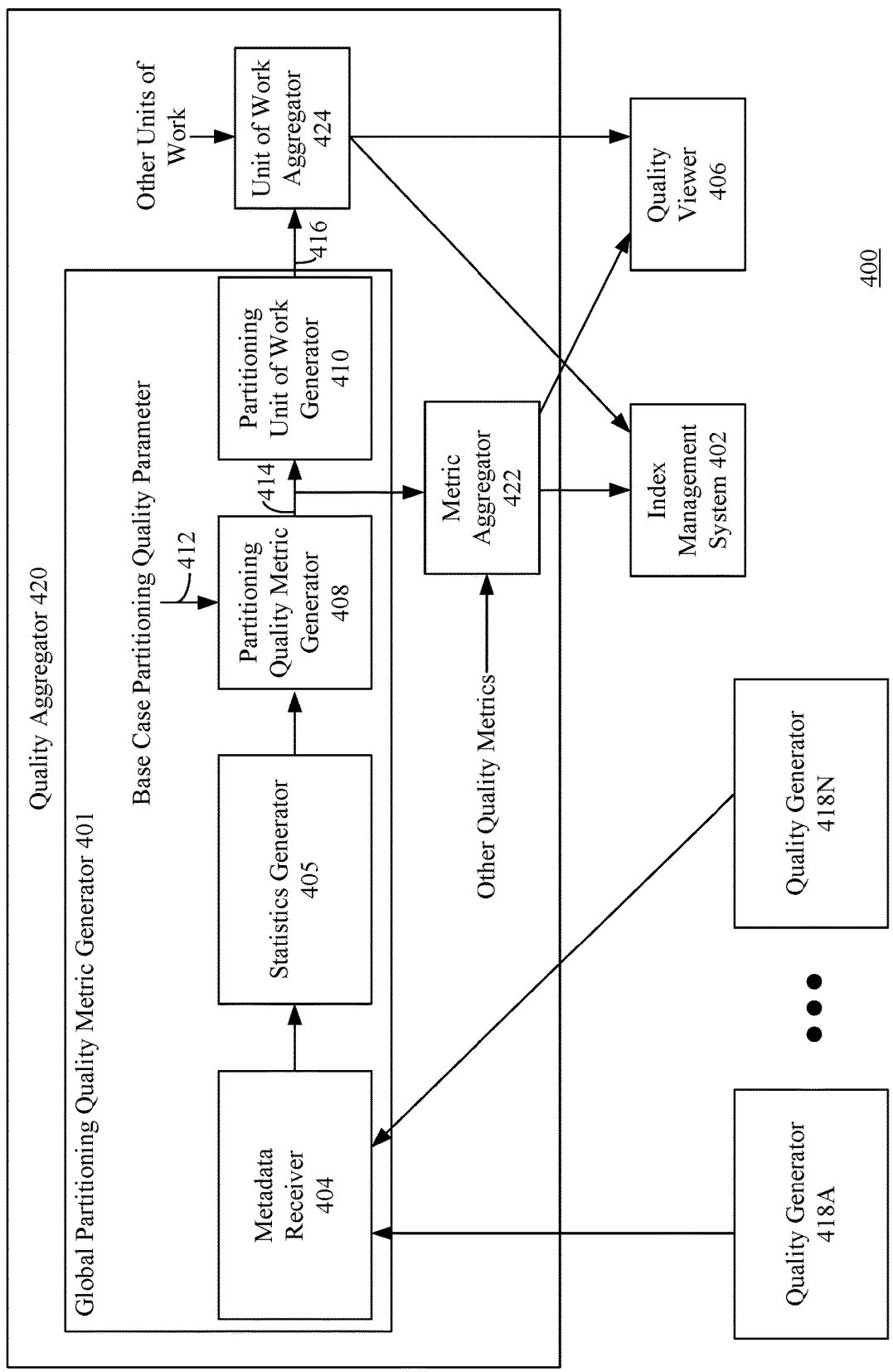
FIG. 4 depicts a block diagram of a system for generating a global partitioning quality metric in accordance with an example embodiment.

FIG. 4 depicts a block diagram of a system 400 for generating a global partitioning quality metric in accordance with an example embodiment. As shown in FIG. 4, system 400 includes quality generators 418A-418N, a quality aggregator 420, an index management system 402, and a quality viewer 406, which are examples of quality generators 218A-218N, quality aggregator 220, index management system 202, and quality viewer 206, as described above with reference to FIG. 2. As further shown in FIG. 4, quality aggregator 420 comprises a global partitioning quality metric generator 401. Global partitioning quality metric generator 401 comprises a metadata receiver 404, a statistics generator 405, a partitioning quality metric generator 408, and a partitioning unit of work generator 410.

Quality generators 418A-418N are each configured to provide metadata retrieved from corresponding metadata catalogs (e.g., metadata catalogs 204A-204N, as shown in FIG. 2) to metadata receiver 404. For example, quality generator 418A may provide metadata such as the number of rows included in a first partition, and quality generator 418N may provide metadata such as the number of rows included in an Nth partition. Metadata receiver 404 provides the received metadata to statistics generator 405.

Statistics generator 405 is configured to generate various statistics associated with the different partitions based on the metadata. For example, statistics generator 405 may generate the standard deviation of the rows stored across the partitions, a range of rows stored across the partitions (e.g., the minimum number of rows stored by a particular partition and the maximum number of rows stored by a particular partition), the mean or average number of rows stored across the partitions, etc. The statistics are provided to partitioning quality metric generator 408.

Partitioning quality metric generator 408 is configured to generate the global partitioning quality metric (shown as global partition quality metric 414) for a database table represented by the different partitions based on the statistics received by statistics generator 405 and a best case partitioning quality parameter 412. For example, partitioning quality metric generator 408 may generate a current partitioning quality value (CPQV), which may be generated in accordance with Equation 1 shown below:

$$CPQV = 1 - \min(sd/mean, 1) \quad \text{(Equation 1)}$$

where sd equals the standard deviation. As shown in FIG. 1, the current partitioning quality value is generated by determining the minimum value of the standard deviation divided by the mean and the value of one. The resulting value is subtracted from one. It is noted that the current partitioning quality may be generated using other techniques.

Global partitioning quality metric 414 (or GPQM) may be generated in accordance with Equation 2, which is shown below:

$$GPQM = 1 - (\text{Best Case Partitioning Q Parameter} - \text{Current Q}) \quad \text{(Equation 2)}$$

where best case partitioning quality parameter 412 is a predetermined parameter that represents the optimal/realistic partitioning quality that can be achieved in the database system. In accordance with an embodiment, best case partitioning quality parameter is a configurable parameter. In the examples described herein, best case partitioning quality parameter 412 is set to the value of one, although the embodiments described herein are not so limited. The value of global partitioning quality metric 414 is relatively higher when the rows are evenly distributed across partitions and is relatively lower when the rows are not evenly distributed across partitions (i.e., the data distribution is skewed). Global partitioning quality metric 414 is provided to partitioning unit of work generator 410 and metric aggregator 422.

Partitioning unit of work generator 410 is configured to generate a partitioning unit of work 416 based on global partitioning quality metric 414. In this example, partitioning unit of work 416 represents the cost (e.g.., the number of database transactions, processing overhead, etc.) for determining a new partitioning key and re-partitioning the database table accordingly. Partitioning unit of work 416 may be a function of global partitioning quality metric 414, where the more skewed the data, the greater the value of partitioning unit of work 416. Conversely, the less skewed the data, the lesser the value of partitioning unit of work 416. A value of zero for partitioning unit of work 416 may indicate that external (i.e., human) intervention is required to determine a new partitioning key, as an index management system (e.g., index management system 202, as shown in FIG. 2) is unable to perform any action to fix the data skew. Partitioning unit of work 416 is provided to unit of work aggregator 424.

Table 1 below describes nine different scenarios in which data is partitioned across five partitions (P1 to P5):

TABLE 1

| P1 | P2 | P3 | P4 | P5 | Mean | ST Dev | CQ | BCQ | Metric |
|---|---|---|---|---|---|---|---|---|---|
| 1000 | 980 | 960 | 940 | 920 | 960 | 31.62278 | 0.97 | 1 | 0.97 |
| 1000 | 900 | 800 | 700 | 600 | 800 | 158.1139 | 0.80 | 1 | 0.80 |
| 1000 | 800 | 650 | 500 | 500 | 690 | 213.3073 | 0.69 | 1 | 0.69 |
| 1000 | 800 | 600 | 400 | 200 | 600 | 316.2278 | 0.47 | 1 | 0.47 |
| 1000 | 700 | 400 | 100 | 50 | 450 | 403.1129 | 0.10 | 1 | 0.10 |
| 1000 | 600 | 200 | 70 | 40 | 382 | 411.3636 | 0.00 | 1 | 0.00 |
| 90 | 1000 | 700 | 200 | 10 | 400 | 429.5928 | 0.00 | 1 | 0.00 |
| 600 | 10 | 10 | 200 | 300 | 224 | 244.6017 | 0.00 | 1 | 0.00 |
| 1000 | 10 | 10 | 10 | 10 | 208 | 442.7415 | 0.00 | 1 | 0.00 |

As shown in Table 1, the global partitioning quality metric is relatively higher as the data is more evenly distributed across the different partitions, and the global partitioning quality metric is relatively lower as the data is less evenly distributed across the different partitions.

Metric aggregator 422 is configured to aggregate quality metrics generated for different properties (e.g., global partitioning quality metric 414, a global clustering quality metric, a global data packing quality metric, a global compaction quality metric, a fragmentation quality metric, etc.). The global clustering quality metric, global data packing quality metric, global compaction quality metric, global fragmentation quality metric are described below in Subsections B-E. The aggregated quality metric (or overall index quality score) is provided to index management system 202 and/or quality viewer 206, as described above with reference to FIG. 2.

Unit of work aggregator 424 is configured to aggregate units of work generated for different properties (e.g., partitioning unit of work 416, a clustering unit of work, a data packing unit of work, a compaction unit of work, a fragmentation unit of work, etc.). The clustering unit of work, data packing unit of work, compaction unit of work, and the fragmentation unit of work are described below in Subsections B-E. The aggregated unit of work (or overall unit of work) is provided to index management system 202 and/or quality viewer 206, as described above with reference to FIG. 2.

Figure 5:
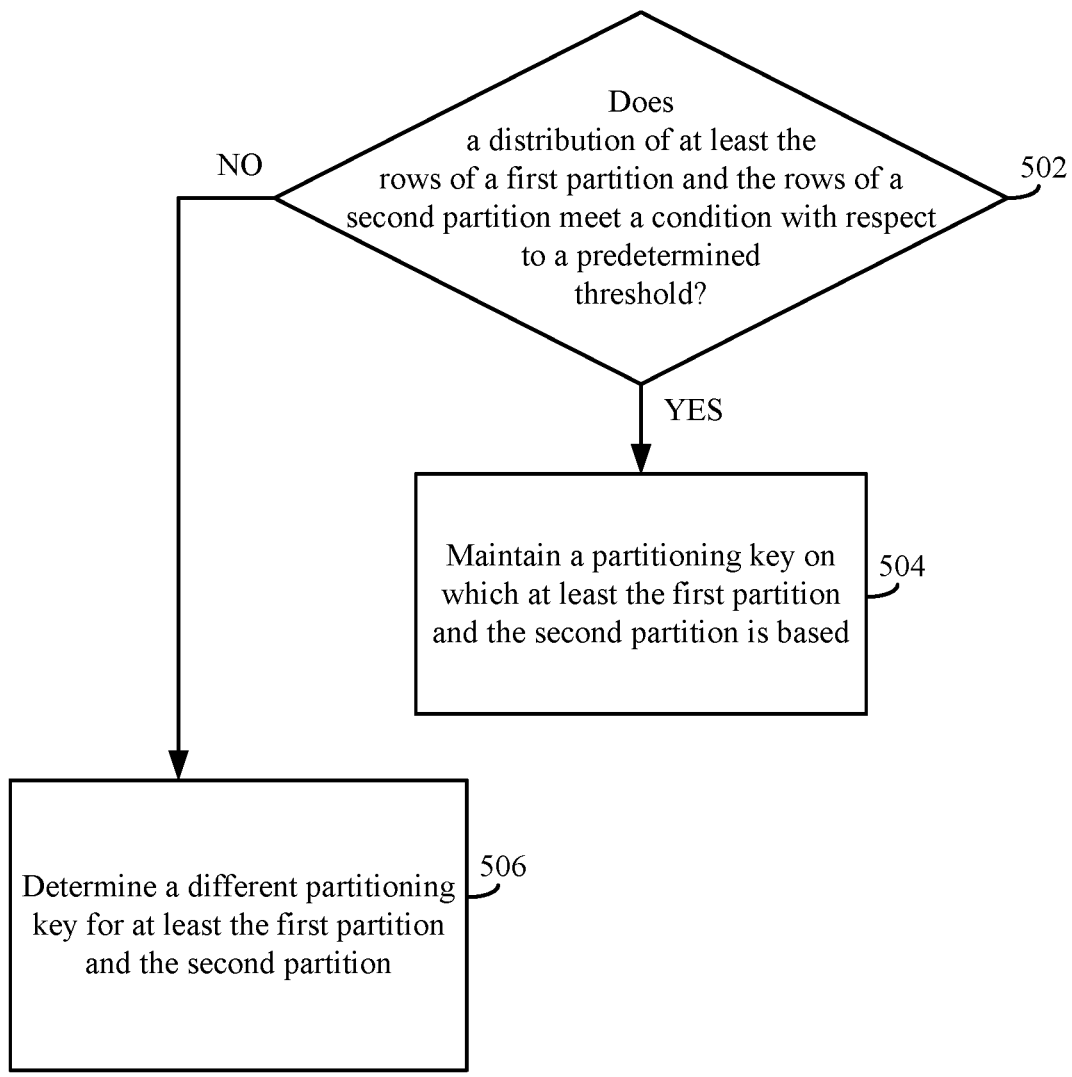
FIG. 5 shows a flowchart of a method for determining a global partitioning quality metric in accordance with an example embodiment.

Accordingly, a global partitioning quality metric may be determined in many ways. For example, FIG. 5 shows a flowchart 500 of a method for determining a global partitioning quality metric in accordance with an example embodiment. In an embodiment, flowchart 500 may be implemented by system 400 shown in FIG. 4, although the method is not limited to that implementation. Accordingly, flowchart 500 will be described with reference to FIG. 4. Other structural and operational embodiments will be apparent to persons skilled in the relevant art(s) based on the discussion regarding flowchart 500 and system 400 of FIG. 4.

Flowchart 500 begins with step 502. In step 502, at least a first quality metric and a second quality metric are analyzed to determine whether at least a distribution of the rows of a first partition and the rows of a second partition meets a condition with respect to a predetermined threshold. The first quality metric may comprise a number of rows of the first partition, and the second quality metric may comprise a number of rows of the second partition. If a determination is made that the distribution meets the condition with respect to the predetermined threshold, flow continues to step 504. Otherwise, flow continues to flow 506. For example, with reference to FIG. 4, metadata receiver 404 may receive the first quality metric from quality generator 418A and receive the second quality metric from quality generator 418N. The first quality metric may be the number of rows of the first partition, and the second quality metric may be the number of rows of the second partition. Statistics generator 405 may determine various statistics indicative of the distribution of the rows across at least the first partition and the second partition. The statistics include, but are not limited to, the standard deviation of rows across the partitions and the mean of rows across the partitions. Partitioning quality metric generator 408 generates global partitioning quality metric 414 based on the generated statistics in accordance with Equation 2 described above. Global partitioning quality metric 414 represents the quality of the distribution of rows across the different partitions. Global partitioning quality metric 414 may be provided to index management system 202, which determines whether the distribution meets a condition with respect to a predetermined threshold. For instance, if the distribution meets the condition (e.g., reaches or exceeds the threshold), flow continues to step 504. Otherwise, flow continues to step 506.

At step 504, a partitioning key on which at least the first partition and the second partition is based is maintained. For example, with reference to FIG. 4, index management system 402 may maintain (i.e., not change the partitioning key, as the distribution of rows across the partitions is acceptable.

At step 506, a different partitioning key is determined for at least the first partition and the second partition. For example, with reference to FIG. 4, index management system 402 determines a different partitioning key. In accordance with an embodiment, the partitioning key may be determined based on an analysis of the distribution of data for each column of the database table. The column having the most optimal distribution may be selected as the new partitioning key.

In accordance with an embodiment, after selecting the new partitioning key, index management system 402 partitions the database table in accordance with the different partitioning key.

B. Clustering Quality Metric

Clustering assists in keeping similar data together in the same data file. A clustering key is selected and data with the same clustering key values are stored together in the same data file for faster access. This means one or more data files are used to store data of a particular clustering key value contiguously. This ensures that during search, only those files are searched. Without good clustering, the data/rows with a particular value will be stored in a non-contiguous manner, and can span across so many files, or even all the files in the system, such that a large number of files are scanned, where each file only has a small number of qualifying rows/data.

The clustering quality is considered good when each data file only has data for a particular clustering key value (single key files). Quality is also considered good if files contain data for multiple clustering key value (multikey files), but for each clustering key value, there is only at most two multikey files (i.e., only two files comprising values for multiple clustering keys). This is because if rows for a clustering key value are not enough to form one single key file, it may be packed with rows for other clustering key values.

For example, if a number of rows for clustering key A are not enough to form a single key file, rows for key B may be added in order to form a multikey file. There may be leftovers of rows for key B, which in turn are not large enough to form a single key file. These rows would be packed with rows of other keys to form yet another multikey file. In this scenario, key A is associated with one multikey file and key B is associated with two multikey files.

When two or more multikey files have some data for a particular key, an overlap of that key occurs. Because files that only have data for a particular clustering key value are considered to be well clustered, only the files that have data for multiple clustering key values are considered when measuring the clustering quality. The quality goal here is to measure how much overlap exists between multikey files. Very large overlap shows bad clustering, which leads to scanning large number of files when finding data for a particular clustering key value.

Figure 6:
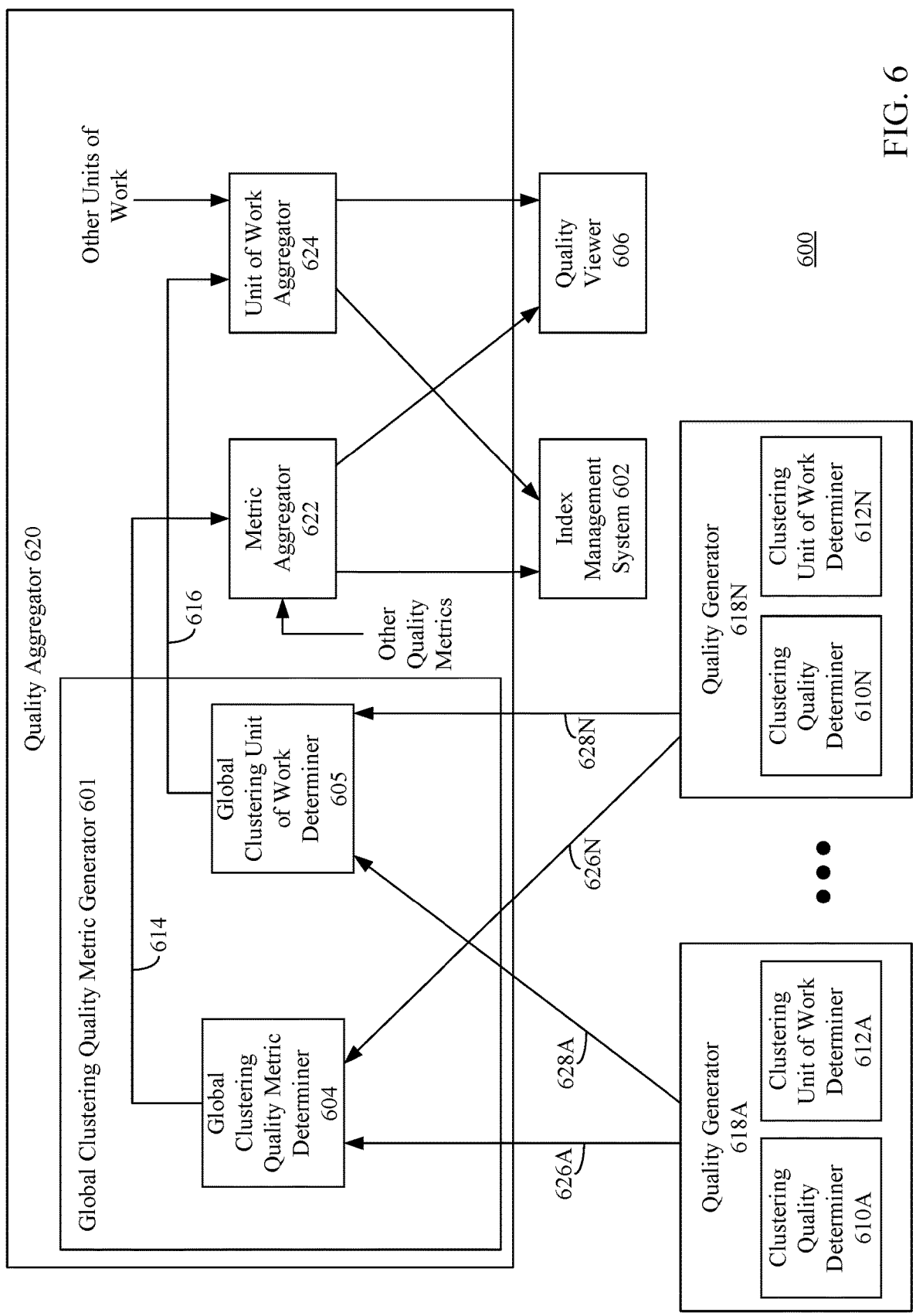
FIG. 6 depicts a block diagram of a system for generating a global clustering quality metric in accordance with an example embodiment.

FIG. 6 depicts a block diagram of a system 600 for generating a global clustering quality metric in accordance with an example embodiment. As shown in FIG. 6, system 600 includes quality generators 618A-618N, a quality aggregator 620, an index management system 602, and a quality viewer 606, which are examples of quality generators 418A-418N, quality aggregator 420, index management system 402, and quality viewer 406, as respectively described above with reference to FIG. 4. As further shown in FIG. 6, quality generator 618A comprises a clustering quality determiner 610A and a clustering unit of work determiner 612A, and quality generator 618N comprises a clustering quality determiner 610N and a clustering unit of work determiner 612N. Quality aggregator 620 comprises a global clustering quality metric generator 601, a metric aggregator 622, and a unit of work aggregator 624. Metric aggregator 622 and unit of work aggregator 624 are examples of metric aggregator 422 and unit of work aggregator 424, as respectively described above with reference to FIG. 4. Global clustering quality metric generator 601 comprises a global clustering quality metric determiner 604 and a global clustering unit of work determiner 605.

Clustering quality determiner 610A is configured to generate a local clustering metric value 626A for the first partition. Clustering quality determiner 610A may determine local clustering metric value 626A based on metadata received from a metadata catalog associated with the first partition (e.g., metadata catalog 204A, as shown in FIG. 2). The metadata may include, for each data file of the first partition, a total number of clustering keys and/or an identifier of each of the clustering keys. Similarly, clustering quality determiner 610N may determine a local clustering metric value 626N based on metadata received from a metadata catalog associated with the Nth partition (e.g., metadata catalog 204N, as shown in FIG. 2). The metadata may include, for each data file in the Nth partition, a total number of clustering keys and/or an identifier of each of the clustering keys.

Clustering quality determiner 610A may determine an overlap value that indicates a maximum number of data files of the first partition that include a row having a particular value of a particular clustering key of first multiple clustering keys. For example, suppose the first partition has eight data files and that the data files are clustered by a clustering key corresponding to the month. In this case, there would be twelve possible values for the clustering key. Further suppose that three of the eight data files comprise different values of the clustering key in various rows of such data files. For example, suppose that a first data file comprises respective rows storing the values "January" and "February," a second data file comprises respective rows storing the values "January," "February", and "March," and a third data file comprises respective rows storing the values "January" and "March." Each of the remaining five data files store a respective same value of the clustering key stored therein. That is, each of the remaining five data files do not store multiple values of the clustering key.

For each value of the clustering key, clustering quality determiner 610A determines how many of the eight data files comprise more than one value of the clustering key. Continuing with the example above, clustering quality determiner 610A determines that there are three such data files (i.e., there are three multikey files). To determine the overlap value, clustering quality determiner 610A, for each value of the clustering key, determines the number of multikey files that comprise the value. In the example above, the value of "January" appears in three multikey files, the value of "February" appears in two multikey files, and the value of "March" appears in two multikey files. Clustering quality determiner 610A designates the maximum number (i.e., 3) of such multikey files as being the overlap value.

Clustering quality determiner 610A generate the current clustering quality (CCQ) based on the overlap value and the total number of multikey files in the first cluster in accordance with Equation 3 below:

$$CCQ = 1 - \left(\frac{\text{overlap value}}{\text{numberofMultiKeyFiles}}\right) \quad \text{(Equation 3)}$$

In the example above, the current clustering quality would be zero (i.e., 1−(3/3)).

Clustering quality determiner 610A may determine clustering quality metric 626A based on the current clustering quality and a determined best case clustering quality. The best case clustering quality may be determined based on a best case maximum overlap (e.g., no more than two data files comprise a particular value of a clustering key) and the total number of multikey files in the first partition. If the determined overlap value is less than or equal to the best case maximum overlap (i.e., there are no values of a clustering key that appear in more than two different data files), then the best case clustering quality, current quality, and clustering quality metric are all set to the value of one (or any other value that is indicative of an optimal clustering quality). Otherwise, the best case clustering quality (BCCQ) may be determined in accordance with Equation 4 shown below:

$$BCCQ = 1 - \left(\frac{\text{best case maximum overlap}}{\text{numberofMultiKeyFiles}}\right) \quad \text{(Equation 4)}$$

Clustering quality metric 626A (CQM) may be determined in accordance with Equation 5, which is shown below:

CQM=1−(BC Clustering Q−Current Clustering Q)  (Equation 5)

Clustering quality determiner 610N may determine clustering quality metric 626N for the Nth partition in a similar manner as clustering quality determiner 610A. It is noted that the best case maximum overlap parameter may be a configurable and specific to a particular database system. It is also noted that clustering quality metric 626A may be determined using other techniques.

Clustering quality determiner 610A may also generate a clustering unit of work 628A based on the determined total number of multikey data files. For example, clustering quality determiner 610A may determine clustering unit of work 628A in accordance with Equation 6, which is shown below:

$$\text{Clustering } UW = \text{ceil}\left(\frac{\text{number of multikey files}}{\text{number of files per clustering action parameter}}\right) \quad \text{(Equation 6)}$$

In accordance with Equation 6, the determined number of multikey files is divided by a number of files per clustering action parameter. The ceiling of the resulting quotient is set as the clustering unit of work. The number of files per clustering action parameter may be a configurable parameter that represents the number of multikey files that can be re-clustered together at any given point of time. The value of the parameter may be specific to the database system in which the embodiments described herein are implemented. In the examples described herein, the parameter is set to the value of five.

Table 2 below describes ten different scenarios in which the clustering quality metric is determined for a partition that comprises ten multikey files:

TABLE 2

| Max Overlap | CQ | BCQ | CQM | UW |
|---|---|---|---|---|
| 0 | 1 | 1 | 1 | 0 |
| 1 | 0.9 | 0.9 | 1 | 0 |
| 2 | 0.8 | 0.8 | 1 | 0 |
| 3 | 0.7 | 0.8 | 0.9 | 2 |
| 4 | 0.6 | 0.8 | 0.8 | 2 |
| 5 | 0.5 | 0.8 | 0.7 | 2 |
| 6 | 0.4 | 0.8 | 0.6 | 2 |
| 7 | 0.3 | 0.8 | 0.5 | 2 |
| 8 | 0.2 | 0.8 | 0.4 | 2 |
| 9 | 0.1 | 0.8 | 0.3 | 2 |
| 10 | 0 | 0.8 | 0.2 | 2 |

Clustering quality determiner 610N may determine clustering unit of work 628N for the Nth partition in a similar manner as clustering quality determiner 610A.

Clustering quality metrics 626A-626N are provided to global clustering quality metric determiner 604, and clustering units of work 628A-628N are provided to global clustering unit of work determiner 605. Global clustering quality metric determiner 604 may determine the greatest (or maximum) of clustering quality metrics 626A-626N and designate the greatest clustering quality metric of clustering quality metrics 626A-626N as being the global clustering quality metric (shown as global clustering quality metric 614). Global clustering quality metric 614 is provided to metric aggregator 622. Maximum clustering unit of work determiner 605 may determine the greatest (or maximum) of clustering units of work 628A-628N and designate the greatest clustering unit of work of clustering units of work 628A-628N as being the global clustering unit of work (shown as global clustering unit of work 616). Global clustering unit of work 616 is provided to metric aggregator 622.

Metric aggregator 622 is configured to aggregate quality metrics generated for different properties (e.g., global partitioning quality metric 414 (as shown in FIG. 4), global clustering quality metric 614, a global data packing quality metric, a global compaction quality metric, a global fragmentation quality metric, etc.). The global data packing quality metric, global compaction quality metric, and global fragmentation quality metric are described below in Subsections C-E. The aggregated quality metric is provided to index management system 602 and/or quality viewer 606, as described above with reference to FIG. 2.

Unit of work aggregator 624 is configured to aggregate units of work generated for different properties (e.g., partitioning unit of work 416 (as shown in FIG. 4), clustering unit of work 616, a data packing unit of work, a compaction unit of work, a fragmentation unit of work, etc.). The data packing unit of work, compaction unit of work, and the fragmentation unit of work are described below in Subsections C-E. The aggregated unit of work is provided to index management system 602 and/or quality viewer 606, as described above with reference to FIG. 2.

Accordingly, a global clustering quality metric may be determined in many ways.

Figure 7:
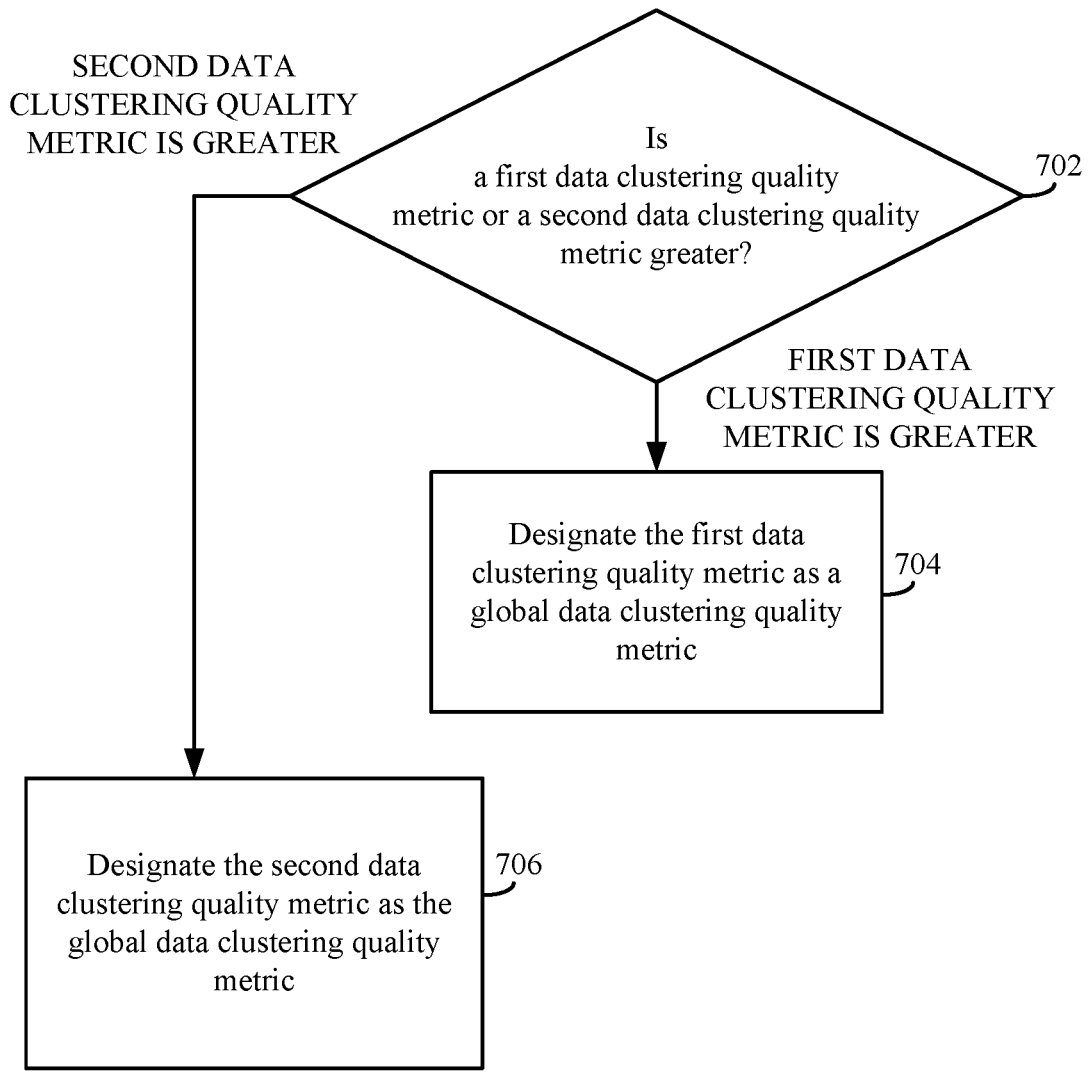
FIG. 7 shows a flowchart of a method for determining a global clustering quality metric in accordance with an example embodiment.

For example, FIG. 7 shows a flowchart 700 of a method for determining a global clustering quality metric in accordance with an example embodiment. In an embodiment, flowchart 700 may be implemented by system 600 shown in FIG. 6, although the method is not limited to that implementation. Accordingly, flowchart 700 will be described with reference to FIG. 6. Other structural and operational embodiments will be apparent to persons skilled in the relevant art(s) based on the discussion regarding flowchart 700 and system 600 of FIG. 6.

Flowchart 700 begins with step 702. In step 702, a greatest data clustering quality metric from among at least a first data clustering quality metric and a second data clustering quality metric is determined. The first data clustering quality metric is based at least on a first overlap value that indicates a maximum number of data files of the first partition that include a row having a particular value of a particular key of a first set of multiple clustering keys. The second data clustering quality metric is based at least on a second overlap value that indicates a maximum number of data files of the second partition that include a row having a particular value of a particular key of a second set of multiple clustering keys. The first and second data clustering quality metrics may be determined in accordance with Equations 3-6, as described above. If the first data clustering quality metric is determined to be the greatest, flow continues to step 704. Otherwise, flow continues to step 706.

For example, with reference to FIG. 6, global clustering quality metric determiner 604 determines which of clustering quality metrics 626A-626N is the greatest clustering quality metric. The determined maximum clustering quality metric of clustering quality metrics 626A-626N is provided to metric aggregator 622.

At step 704, the first data clustering quality metric is designated as a global data clustering quality metric. For example, with reference to FIG. 6, global clustering quality metric determiner 604 may designate clustering quality metric 626A as being global clustering quality metric 614.

At step 706, the second data clustering quality metric is designated as the global data clustering quality metric. For example, with reference to FIG. 6, global clustering quality metric determiner 604 may designate clustering quality metric 626N as being global clustering quality metric 614.

In accordance with an embodiment, responsive to determining that the clustering of a particular partition is suboptimal, index management system 602 may re-cluster the data files of that partition. For example, in response to determining that the first data clustering quality metric is the greatest data clustering quality metric, index management system 602 may re-cluster at least a subset of the data files of the first partition that store rows having values for the first multiple clustering keys such that at least the subset of the data files of the first partition store rows having values for a single clustering key of the first multiple clustering keys. In response to determining that the second data clustering quality metric is the greatest data clustering quality metric, index management system 602 may re-cluster at least a subset of the data files of the first partition that store rows having values for the first multiple clustering keys such that at least the subset of the data files of the first partition store rows having values for a single clustering key of the first multiple clustering keys.

For instance, in the example in which the value of "January" appears in three multikey files, the value of "February" appears in two multikey files, and the value of "March" appears in two multikey files, these multikey files may be re-clustered such that the value of "January" from the three multikey files now appears in a first data file, the value of "February" from the two multikey files now appears in a second data file, and the value of "March" from the two multikey files now appears in a third data file.

C. Data Packing Quality Metric

In data systems, data/rows are packed together to form data files. In big data systems, data compression may be applied to help reduce the data file size and the overall data size. There should be large amount of data in a file in order to benefit from compression. The file size also affects input/output (I/O) cost. Because, in big data systems, the files may be stored in remote storage, having large enough files reduces the number of I/O calls, but should not be too large that it severely affects the latency of I/O requests. Systems usually have policies around the maximum/ideal number of rows that can be stored in each file and try to create files that satisfy this policy. However, during data load, small-sized files may be created due to system resource constraints or for other reasons.

The data packing quality metric described herein involves looking at the quality of files in the system in terms of the number of rows stored in each file. Files have a good data packing quality when they have the ideal number of rows which results in better compression and performance. When files are created with a number of rows less than the ideal number of rows, the benefits of compression are lost and can lead to inefficient performance.

Figure 8:
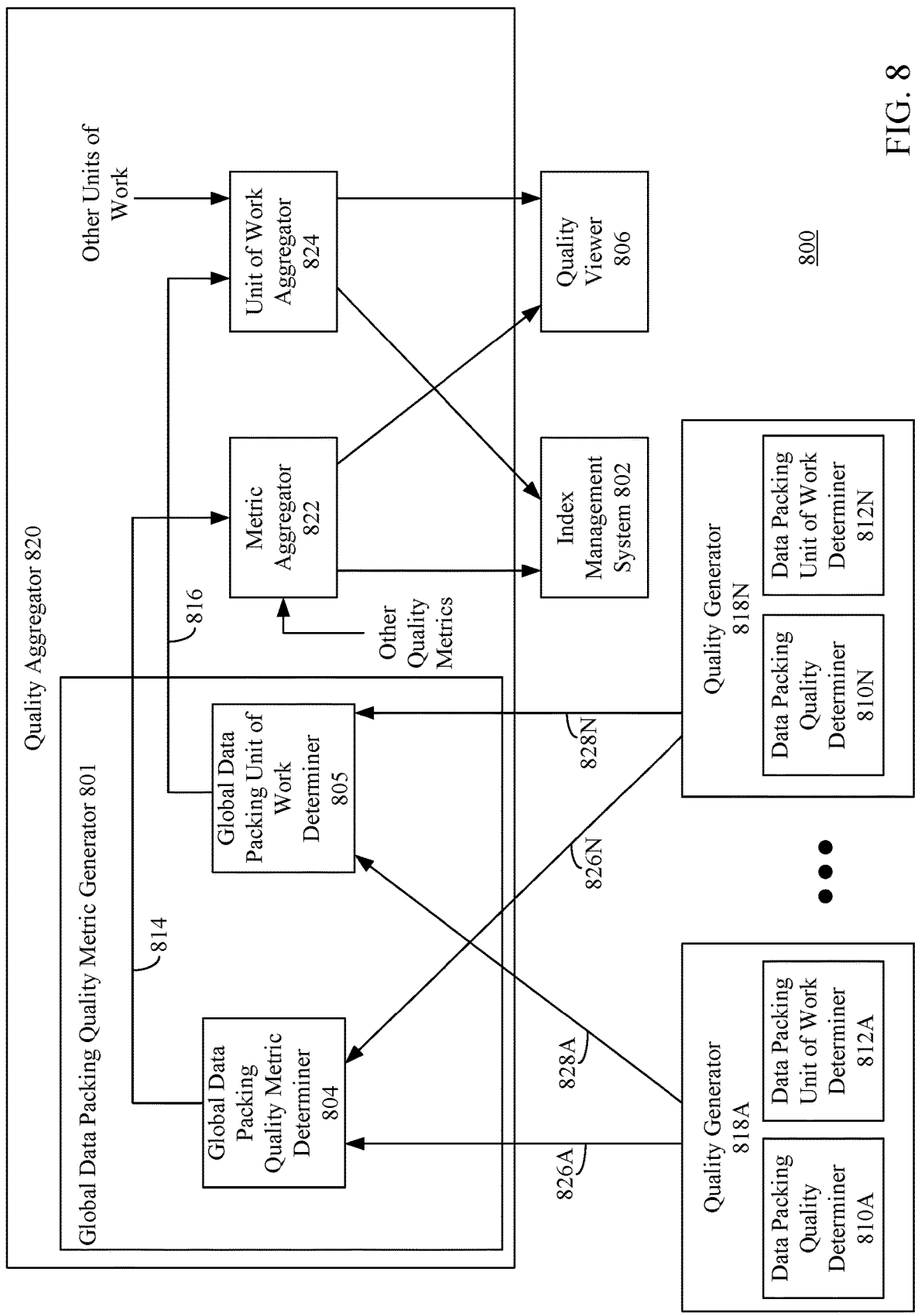
FIG. 8 depicts a block diagram of a system for generating a global data packing quality metric in accordance with an example embodiment.

FIG. 8 depicts a block diagram of a system 800 for generating a global data packing quality metric in accordance with an example embodiment. As shown in FIG. 8, system 800 includes quality generators 818A-818N, a quality aggregator 820, an index management system 802, and a quality viewer 806, which are examples of quality generators 618A-618N, quality aggregator 620, index management system 602, and quality viewer 606, as respectively described above with reference to FIG. 6. As further shown in FIG. 8, quality generator 818A comprises a data packing quality determiner 810A and a data packing unit of work determiner 812A, and quality generator 818N comprises a data packing quality determiner 810N and a data packing unit of work determiner 812N. Quality aggregator 820 comprises a global data packing quality metric generator 801, a metric aggregator 822, and a unit of work aggregator 824. Metric aggregator 822 and unit of work aggregator 824 are examples of metric aggregator 622 and unit of work aggregator 624, as respectively described above with reference to FIG. 6. Global data packing quality metric generator 801 comprises a global data packing quality metric determiner 804 and a global data packing unit of work determiner 805.

Data packing quality determiner 810A is configured to generate a local data packing metric value 826A for the first partition. Data packing quality determiner 810A may determine local data packing metric value 610A based on metadata received from a metadata catalog associated with the first partition (e.g., metadata catalog 204A, as shown in FIG. 2). The metadata may include a number of rows stored by each file of the first partition. Similarly, data packing quality determiner 810N may determine local data packing metric value 826N based on metadata received from a metadata catalog associated with the Nth partition (e.g., metadata catalog 204N, as shown in FIG. 2). The metadata may include a number of rows stored by each file of the Nth partition.

Data packing quality determiner 610A may, for each file of the first partition, determine a file quality value based on the number of rows stored by the file and an ideal row count parameter. The ideal row count may be a configurable parameter that is specific to a particular database system. The ideal row count represents an ideal row count that a data file should have for optimal performance. In accordance with an embodiment, the file quality value for a particular data file may be determined in accordance with Equation 7 shown below:

$$\text{File Quality Value} = \frac{\text{number of rows of the file}}{\text{ideal row count}} \quad \text{(Equation 7)}$$

Data packing quality determiner 810A may determine whether the determined file quality value meets a condition with respect to a predetermined threshold (e.g., whether the file quality value is greater than or equal to the predetermined threshold). If the file quality value meets the condition, data packing quality determiner 810A may classify the data file as having a relatively high file quality. Otherwise, data packing quality determiner 810A classifies the data file as having a relatively low (or bad) file quality.

Data packing quality determiner 610A may also generate a total file quality by summing the file quality value generated for each file of the first partition. Data packing quality may generate a current file quality value (CFQV) based on an average file quality, which may be determined by dividing the total file quality by the total number of files of the first partition, as shown below in Equation 8:

$$CFQV = \frac{\text{total file quality}}{\text{total number of files in the partition}} \quad \text{(Equation 8)}$$

Data packing quality determiner 810A may determine data packing quality metric 826A based on the current file quality value and a determined best case file quality value.

The best case file quality value may be determined in accordance with Equation 9 shown below:

$$BC \text{ File } Q \text{ Value} = \frac{\text{total file quality}}{\text{ceil(total file quality)}} \quad \text{(Equation 9)}$$

As shown in Equation 9, the best case file quality value may be determined by dividing the total file quality by the ceiling of the total file quality.

Data packing quality metric 626A (DPQM) may be determined in accordance with Equation 10 shown below:

$$DPQM = 1 - (\text{Best File QV} - \text{Current File QV}) \quad \text{(Equation 10)}$$

Data packing quality determiner 810A may determine data packing quality metric 826N for the Nth partition in a similar manner as data packing quality determiner 810A.

Data packing quality determiner 810A may also generate a data packing unit of work 828A based on the determined number of low quality files and a number of file per file merge action parameter. For example, data packing quality determiner 810A may determine data clustering unit of work 828A in accordance with Equation 11, which is shown below:

$$\text{Data Packing } UW = \text{ceil}\left(\frac{\text{number of low quality files}}{\text{number of files per merge action parameter}}\right) \quad \text{(Equation 11)}$$

In accordance with Equation 11, the determined number of low quality files is divided by the number of files per merge action parameter. The ceiling of the resulting quotient is set as data packing unit of work 828A. The number of files per merge action parameter may be a configurable parameter that represents the number of files that can be merged together at any given point of time. The value of the parameter may be specific to the database system in which the embodiments described herein are implemented. In the examples described herein, the parameter is set to the value of five.

Table 3 below describes the determined file quality value for five data files in a particular partition in which the ideal row count is sent to one million rows:

TABLE 3

| File | Number of rows | File quality |
| --- | --- | --- |
| F1 | 1M | 1 |
| F2 | 500K | 0.5 |
| F3 | 300K | 0.3 |
| F4 | 200K | 0.2 |
| F5 | 100K | 0.1 |

In the above example, the total file quality is equal to 2.1, the current file quality is equal to 0.42 (2.1/5=0.42), the best case quality is equal to 0.7 (2.1/3=0.7), the data packing quality metric is equal to 0.72 (1−(0.7−0.42)=0.72), and the data packing unit of work is 1 (ceil(4/5)).

Data packing quality determiner 810N may determine data packing unit of work 828N for the Nth partition in a similar manner as data packing quality determiner 810A.

Data packing quality metrics 826A-826N are provided to global data clustering quality metric determiner 804, and data packing units of work 828A-828N are provided to global clustering unit of work determiner 605. Global clustering quality metric determiner 804 may average data clustering quality metrics 626A-626N and designate the determined average as being the global data clustering quality metric (shown as global data packing quality metric 814). Data packing quality metric 814 is provided to metric aggregator 822. Global data packing unit of work determiner 605 may determine average data packing units of work 828A-828N and designate the determined average as being the global data packing unit of work (shown as global data packing unit of work 816). Global data packing unit of work 816 is provided to metric aggregator 822.

Metric aggregator 822 is configured to aggregate quality metrics generated for different properties (e.g., global partitioning quality metric 414 (as shown in FIG. 4), global clustering quality metric 614 (as shown in FIG. 6), global data packing quality metric 814, a global compaction quality metric, a global fragmentation quality metric, etc.). The global data global compaction quality metric and global fragmentation quality metric are described below in Subsections D-E. The aggregated quality metric is provided to index management system 802 and/or quality viewer 806, as described above with reference to FIG. 2.

Unit of work aggregator 824 is configured to aggregate units of work generated for different properties (e.g., partitioning unit of work 416 (as shown in FIG. 4), clustering unit of work 616 (as shown in FIG. 6), data packing unit of work 816, a compaction unit of work, and a fragmentation unit of work, etc.). The compaction unit of work and the fragmentation unit of work are described below in Subsections D-E. The aggregated unit of work is provided to index management system 802 and/or quality viewer 806, as described above with reference to FIG. 8.

Accordingly, a global data packing quality metric may be determined in many ways. For example, FIG. 9 shows a flowchart 900 of a method for determining a global data packing quality metric in accordance with an example embodiment. In an embodiment, flowchart 900 may be implemented by system 800 shown in FIG. 8, although the method is not limited to that implementation. Accordingly, flowchart 900 will be described with reference to FIG. 8. Other structural and operational embodiments will be apparent to persons skilled in the relevant art(s) based on the discussion regarding flowchart 900 and system 800 of FIG. 8.

Flowchart 900 begins with step 902. In step 902, a global data packing quality metric is generated based at least on a first data packing metric and a second data packing metric. The first data quality metric is based on a first average file quality of data files of a first partition, the first average file quality being based on a number of rows stored by each of the data files of the first partition and a predetermined ideal row count parameter. The second data quality metric is based on a second average file quality of data files of a second partition, the second average file quality being based on a number of rows stored by each of the data files of the second partition and the predetermined ideal row count parameter.

For example, with reference to FIG. 8, global clustering quality metric determiner 804 determines global data packing quality metric 814 based on local data packing metric values 826A-826N.

In accordance with an embodiment, responsive to determining that the data packing of a particular partition is sub-optimal, index management system 802 may merge two or more data files of that partition. For example, if global data packing quality metric 814 does not meet a condition with a predetermined threshold, index management system 802 may merge two or more data files of the first partition each having a number of rows that is less than the predetermined ideal row count parameter and/or merge two or more data files of the second partition each having a number of rows that is less than the predetermined ideal row count parameter. This way, data files that have a number of rows that are less than the ideal row count parameter may be merged together to create larger files that includes rows that are closer to the ideal row count parameter.

D. Compaction Quality Metric

In big data systems, data compression/compaction may be applied to help reduce the file size and the overall data size. This helps to provide better query performance by reducing I/O latency. During data load, uncompressed data may be loaded into the system, which is later compressed. Sometimes compression is not done immediately. During this time the uncompressed data may be queried leading to slower performance. In these systems, performance is usually better when all the data is compressed.

Determining a compaction quality metric may involve analyzing the number of uncompressed data/rows in the system. The more the number of uncompressed rows, the more the impact on performance. Systems may have a compression threshold, such that once this is met, it becomes important to compress the data. This is because having few uncompressed rows will have little to no impact on the system.

Figure 10:
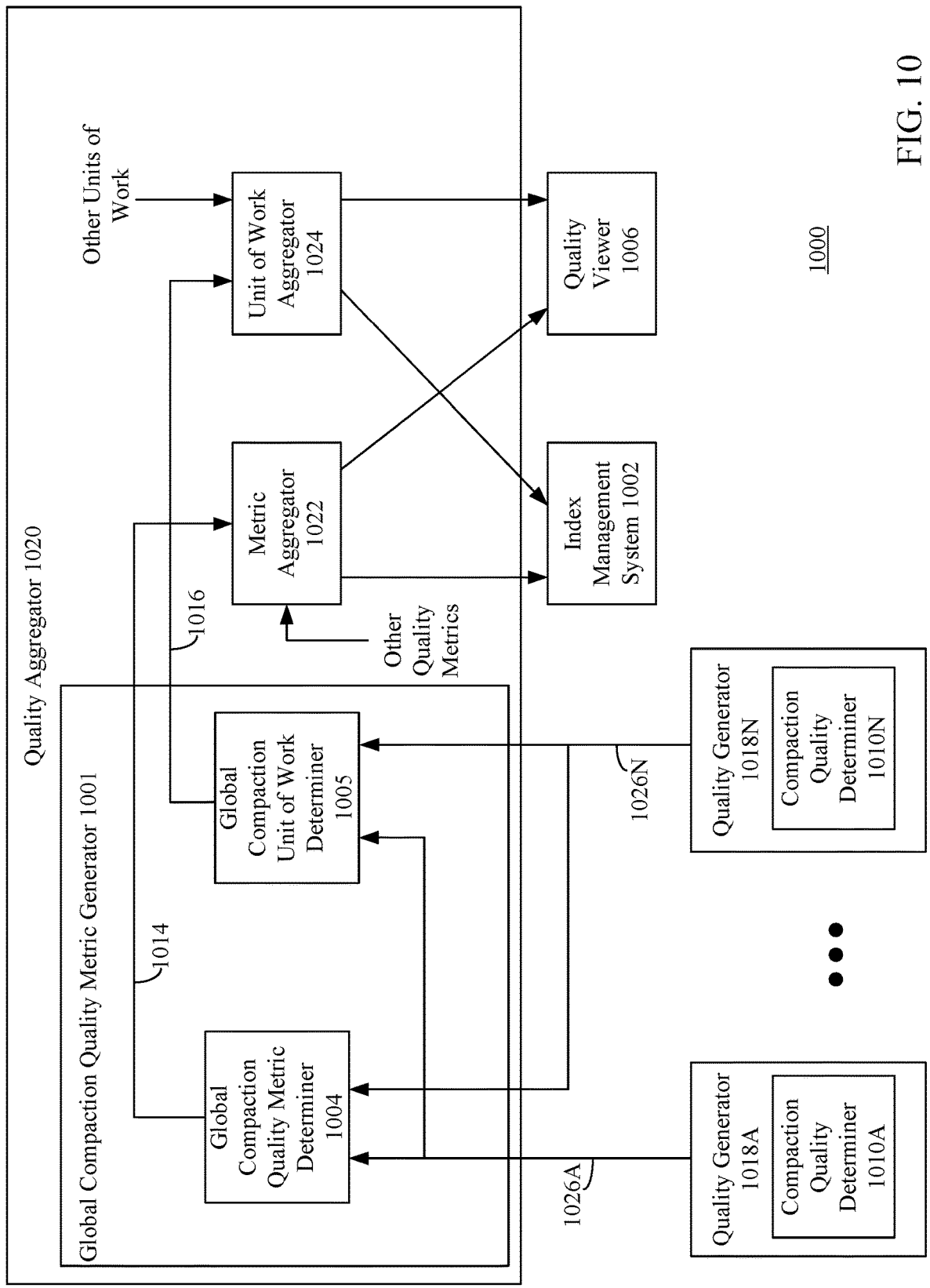
FIG. 10 depicts a block diagram of a system for generating a global compaction quality metric in accordance with an example embodiment.

FIG. 10 depicts a block diagram of a system 1000 for generating a global compaction quality metric in accordance with an example embodiment. As shown in FIG. 10, system 1000 includes quality generators 1018A-1018N, a quality aggregator 1020, an index management system 1002, and a quality viewer 1006, which are examples of quality generators 818A-818N, quality aggregator 820, index management system 802, and quality viewer 806, as respectively described above with reference to FIG. 8. As further shown in FIG. 10, quality generator 1018A comprises a compaction quality determiner 1010A, and quality generator 1018N comprises a compaction quality determiner 1010N. Quality aggregator 1020 comprises a global compaction quality metric generator 1001, a metric aggregator 1022, and a unit of work aggregator 1024. Metric aggregator 1022 and unit of work aggregator 1024 are examples of metric aggregator 822 and unit of work aggregator 824, as respectively described above with reference to FIG. 8. Global compaction quality metric generator 1001 comprises a global compaction quality metric determiner 1004 and a global compaction unit of work determiner 1005.

Compaction quality determiner 1010A is configured to provide a local compaction metric 1026A for the first partition to global compaction quality metric determiner 1004. Local compaction metric 1026A may comprise the number of uncompressed rows for the first partition, which compaction quality determiner 1010A obtains from metadata received from a metadata catalog associated with the first partition (e.g., metadata catalog 204A, as shown in FIG. 2). Similarly, compaction quality determiner 1010N is configured to provide a local compaction metric 1026N for the Nth partition to global compaction quality metric determiner 1004. Local compaction metric value 1026N may comprise the number of uncompressed rows for the first partition, which compaction quality determiner 1010N obtains from metadata received from a metadata catalog associated with the Nth partition (e.g., metadata catalog 204N, as shown in FIG. 2).

Global compaction quality metric determiner 1004 may determine a current compaction quality value based on the number of uncompressed rows across all partitions and a compression threshold parameter. The compression threshold may be a configurable parameter that is specific to a particular database system. The compression threshold represents a maximum number of uncompressed row that the system may include without severely affecting the performance thereof. In accordance with an embodiment, the current compaction quality value (CCQV) may be determined in accordance with Equation 12 shown below:

$$CCQV = 1 - \min\left(\left(\frac{\text{number of uncompressed rows across partitions}}{\text{compression threshold parameter}}, 1\right)\right) \quad \text{(Equation 12)}$$

In accordance with Equation 12, the current compaction quality value may be determined by determining the minimum between (a) the quotient resulting from the number of uncompressed rows across the partitions divided by the compression threshold parameter and (b) the value of 1. The resulting minimum value is then subtracted from the value of 1. A current compaction quality value of zero means that the compression threshold has been reached. A current compaction quality value of one means that there are no uncompressed rows (i.e., the ideal situation).

Compaction quality determiner 1010A may determine compaction quality metric 1026A based on the current compaction quality value and a determined best case compaction quality value. The best case compaction quality value may be determined by comparing the number of uncompressed rows to the compression threshold parameter. If the number of uncompressed rows is less than the compression threshold parameter, then the best case compaction quality value is set to the value of the current compaction quality value. Otherwise, the best case compaction quality value is set to the value of one.

Compaction quality metric 1026A may be determined in accordance with Equation 13 shown below:

Compaction QM=1−(Best Case CQV−CCQV)   (Equation 13)

Global compaction unit of work determiner 1005 may also generate a global compaction unit of work 1016 based on the number of uncompressed rows across the partitions and the compression threshold parameter. For example, global compaction unit of work determiner 1005 may determine global compaction unit of work 1016 in accordance with Equation 14, which is shown below:

(Equation 14)

$$\text{Compaction } UW = \text{floor}\left(\frac{\text{number of uncompressed rows across partitions}}{\text{compression threshold parameter}}\right)$$

In accordance with Equation 14, the number of uncompressed rows of across the partitions is divided by the compression threshold parameter. The floor of the resulting quotient is set as compaction unit of work 1016.

Table 4 below provides examples of determined global compaction quality metrics and global compaction units of work for thirteen different scenarios. In this example, the compression threshold is set to one million rows:

TABLE 4

| Number of uncompressed rows | CQ | BCQ | Quality | UW |
|---|---|---|---|---|
| 0 | 1 | 1 | 1 | 0 |
| 10,000 | 0.99 | 0.99 | 1 | 0 |
| 100,000 | 0.9 | 0.9 | 1 | 0 |
| 200,000 | 0.8 | 0.8 | 1 | 0 |

TABLE 4-continued

| Number of uncompressed rows | CQ | BCQ | Quality | UW |
|---|---|---|---|---|
| 300,000 | 0.7 | 0.7 | 1 | 0 |
| 400,000 | 0.6 | 0.6 | 1 | 0 |
| 500,000 | 0.5 | 0.5 | 1 | 0 |
| 600,000 | 0.4 | 0.4 | 1 | 0 |
| 700,000 | 0.3 | 0.3 | 1 | 0 |
| 800,000 | 0.2 | 0.2 | 1 | 0 |
| 900,000 | 0.1 | 0.1 | 1 | 0 |
| 1,000,000 | 0 | 1 | 0 | 1 |
| 1,200,000 | 0 | 1 | 0 | 1 |

Metric aggregator 822 is configured to aggregate quality metrics generated for different properties (e.g., global partitioning quality metric 414 (as shown in FIG. 4), global clustering quality metric 614 (as shown in FIG. 6), global data packing quality metric 814 (as shown in FIG. 8), global compaction quality metric 1014, and a fragmentation quality metric, etc.). The global fragmentation quality metric is described below in Subsection E. The aggregated quality metric is provided to index management system 1002 and/or quality viewer 1006, as described above with reference to FIG. 2.

Unit of work aggregator 1024 is configured to aggregate units of work generated for different properties (e.g., partitioning unit of work 416 (as shown in FIG. 4), clustering unit of work 616 (as shown in FIG. 6), data packing unit of work 816 (as shown in FIG. 8), compaction unit of work 1016, and a fragmentation unit of work, etc.). The fragmentation unit of work is described below in Subsection E. The aggregated unit of work is provided to index management system 1002 and/or quality viewer 1006, as described above with reference to FIG. 2.

Accordingly, a compaction quality metric may be determined in many ways. For example, FIG. 11 shows a flowchart 1100 of a method for determining a global compaction quality metric in accordance with an example embodiment. In an embodiment, flowchart 1100 may be implemented by system 1000 shown in FIG. 10, although the method is not limited to that implementation. Accordingly, flowchart 1100 will be described with reference to FIG. 10. Other structural and operational embodiments will be apparent to persons skilled in the relevant art(s) based on the discussion regarding flowchart 1100 and system 1000 of FIG. 10.

Flowchart 1100 begins with step 1102. In step 1102, a global compaction quality metric is generated based at least on a combination of a first compaction quality metric and a second compaction quality metric and a predetermined compression threshold parameter. The first compaction quality metric comprises a value based on a number of uncompressed rows maintained by data files of the first partition. The second compaction quality metric comprises a value based on a number of uncompressed rows maintained by data files of the second partition. For example, with reference to FIG. 10, global compaction quality metric determiner 1004 determines global compaction quality metric 1014 based on the total number of uncompressed rows across all the partitions and the predetermined compression threshold. In accordance with an embodiment, global compaction quality metric 1014 may be generated in accordance with Equation 13 as described above.

In accordance with an embodiment, responsive to determining that the compression of the partitions is sub-optimal, index management system 1002 may compress the uncompressed rows of the data files maintained by the partitions. For example, if global compression quality metric 1014 does not meet a condition with a predetermined threshold, index management system 1002 may compress the uncompressed rows of the data files maintained by the first partition and/or compress the uncompressed rows of the data files maintained by the second partition.

E. Fragmentation Quality Metric

Data systems usually support delete operations, but in big data systems the actual deletion of the data does not happen immediately. Especially when the data is compressed, the deleted rows in files are simply tracked as deleted in a delete map rather than immediately deleting those rows in the files. Thus, a data file can have a certain percentage of rows that are already marked as deleted. This means when this file is scanned, the delete map would also have to be scanned in order to skip the deleted rows. As the number of deleted rows in the file increases, the size of the delete map and the number of rows to skip increases, therefore making scanning such data files inefficient, as it only contains a few qualifying (undeleted) rows.

Figure 12:
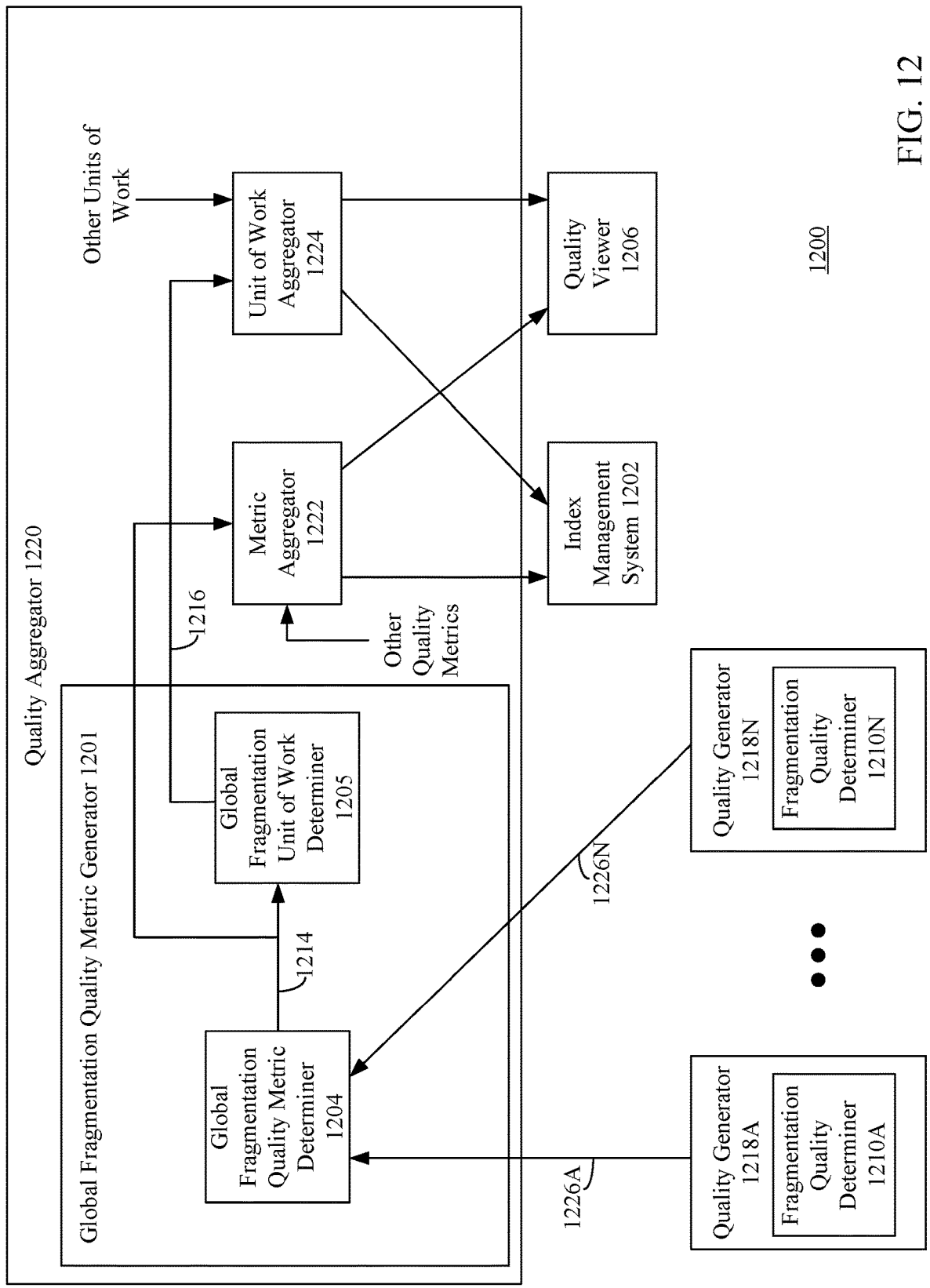
FIG. 12 depicts a block diagram of a system for generating a global fragmentation quality metric in accordance with an example embodiment.

Determining a fragmentation quality metric may involve calculating the percentage of rows marked for deletion in a compressed data file. The higher the number of deleted rows in the file, the larger the delete map that needs to be scanned. FIG. 12 depicts a block diagram of a system 1200 for generating a global fragmentation quality metric in accordance with an example embodiment. As shown in FIG. 12, system 1200 includes quality generators 1218A-1218N, a quality aggregator 1220, an index management system 1202, and a quality viewer 1206, which are examples of quality generators 1018A-1018N, quality aggregator 1020, index management system 1002, and quality viewer 1006, as respectively described above with reference to FIG. 10. As further shown in FIG. 12, quality generator 1218A comprises a fragmentation quality determiner 1210A, and quality generator 1218N comprises a fragmentation quality determiner 1210N. Quality aggregator 1220 comprises a global fragmentation quality metric generator 1201, a metric aggregator 1222, and a unit of work aggregator 1224. Metric aggregator 1222 and unit of work aggregator 1224 are examples of metric aggregator 1022 and unit of work aggregator 1024, as respectively described above with reference to FIG. 10. Global fragmentation quality metric generator 1201 comprises a global fragmentation quality metric determiner 1204 and a global fragmentation unit of work determiner 1205.

Fragmentation quality determiner 1210A is configured to provide a local fragmentation metric 1226A for the first partition to global fragmentation quality metric determiner 1204. Local fragmentation metric value 1226A may comprise one or more delete maps that indicate all the rows marked for a deletion for each active data file of the first partition and a total number of rows for each active data file in the first partition. An active data file is a data file comprises at least one row that is not marked for deletion (i.e., an active row). Fragmentation quality determiner 1210A may obtain the delete map(s) and the total number of rows from metadata received from a metadata catalog associated with the first partition (e.g., metadata catalog 204A, as shown in FIG. 2). Similarly, compaction quality determiner 1210N is configured to provide a local fragmentation metric 1226N for the Nth partition to global fragmentation quality metric determiner 1204. Local fragmentation metric 1226N may comprise delete map(s) that indicate all the rows marked for a deletion for each active data file of the Nth partition and a total number of rows for each active data file in the Nth partition. Fragmentation quality determiner 1210N may obtain the delete map(s) and the total number of rows from metadata received from a metadata catalog associated with the Nth partition (e.g., metadata catalog 204N, as shown in FIG. 2).

Global fragmentation quality metric determiner 1204 may determine a current fragmentation quality based on the number of deleted rows for each active data file of all partitions and the total number of rows for each active data file of all partitions. In accordance with an embodiment, the current fragmentation quality value (CFQV) may be determined in accordance with Equation 15 shown below:

$$CFQV = Avg\left(1 - \left(\frac{\text{number of } deleted \text{ rows of an active data file}}{\text{total number of rows of the active data file}}\right)\right) \quad \text{(Equation 15)}$$

In accordance with Equation 15, for each active file, the number of deleted rows of that file is divided by the total number of rows of that file. The resulting quotient is subtracted from the value of 1. The resulting value generated for each active data file is then averaged to determine the current fragmentation quality value. A current fragmentation quality value of zero means that all rows in the compressed files have been deleted. A current fragmentation quality value of one means that there are no rows deleted in any of the compressed files (i.e., the ideal situation).

Global fragmentation quality metric determiner 1204 may determine a global fragmentation quality metric 1214 based on the current fragmentation quality value and a predetermined best case fragmentation quality value. The best case fragmentation quality value may parameter may be a configurable and specific to a particular database system. In the embodiments described herein, the best case fragmentation quality is set to the value of, meaning that it is best to have no deleted row in any active compressed file.

Global fragmentation quality metric 1214 (GFQM) may be determined in accordance with Equation 16 shown below:

$$GFQM = 1 - (\text{Best Case FQV} - \text{FCQV}) \quad \text{(Equation 16)}$$

Global fragmentation unit of work determiner 1205 may also generate a global fragmentation unit of work 1216 based on global fragmentation quality metric 1214. For instance, the greater the global fragmentation quality metric 1214, the lower the global fragmentation unit of work 1216. Conversely, the lower the global fragmentation quality metric 1214, the higher the global fragmentation unit of work 1216. The value of global fragmentation unit of work 1216 represents the estimated cost to either delete the rows marked for deletion or move the rows marked for deletion into an inactive file (i.e., a file that only stores rows marked for deletion).

Table 5 below provides examples of determined quality metric values for twelve different files. In this example, each file stores one million rows:

TABLE 5

| File | Number of deleted rows | 1—deleted rows/total rows |
|---|---|---|
| F1 | 0 | 1 |
| F2 | 10,000 | 0.99 |
| F3 | 100,000 | 0.9 |
| F4 | 200,000 | 0.8 |
| F5 | 300,000 | 0.7 |
| F6 | 400,000 | 0.6 |

TABLE 5-continued

| File | Number of deleted rows | 1—deleted rows/total rows |
|---|---|---|
| F7 | 500,000 | 0.5 |
| F8 | 600,000 | 0.4 |
| F9 | 700,000 | 0.3 |
| F10 | 800,000 | 0.2 |
| F11 | 900,000 | 0.1 |
| F12 | 1,000,000 | 0 |

In accordance with Table 5, current fragmentation quality value is equal to 0.54 (i.e., the average of the values stored in the third column) and global fragmentation quality metric 1214 is equal to 0.54 (in accordance with Equation 16 described above).

Metric aggregator 1222 is configured to aggregate quality metrics generated for different properties (e.g., global partitioning quality metric 414 (as shown in FIG. 4), global clustering quality metric 614 (as shown in FIG. 6), global data packing quality metric 814 (as shown in FIG. 8), global compaction quality metric 1014 (as shown in FIG. 10), and global fragmentation quality metric 1214, etc.). The aggregated quality metric is provided to index management system 1202 and/or quality viewer 1206, as described above with reference to FIG. 2.

Unit of work aggregator 1224 is configured to aggregate units of work generated for different properties (e.g., partitioning unit of work 416 (as shown in FIG. 4), clustering unit of work 616 (as shown in FIG. 6), data packing unit of work 816 (as shown in FIG. 8), compaction unit of work 1016 (as shown in FIG. 10), and fragmentation unit of work 1216, etc.). The aggregated unit of work is provided to index management system 1202 and/or quality viewer 1206, as described above with reference to FIG. 2.

Accordingly, a fragmentation quality metric may be determined in many ways. For example, FIG. 13 shows a flowchart 1300 of a method for determining a global fragmentation quality metric in accordance with an example embodiment. In an embodiment, flowchart 1300 may be implemented by system 1200 shown in FIG. 12, although the method is not limited to that implementation. Accordingly, flowchart 1300 will be described with reference to FIG. 12. Other structural and operational embodiments will be apparent to persons skilled in the relevant art(s) based on the discussion regarding flowchart 1300 and system 1200 of FIG. 12.

Flowchart 1300 begins with step 1302. In step 1302, a global fragmentation quality metric is generated based at least on a combination of a first fragmentation quality metric and a second fragmentation quality metric and a total number of rows in at least the first partition and the second partition. The first fragmentation quality metric comprises a value based on a number of rows that are marked for deletion in data files of the first partition, and the second fragmentation quality metric comprises a value based on a number of rows that are marked for deletion in data files of the second partition. For example, with reference to FIG. 12, global fragmentation quality metric determiner 1204 determines global fragmentation quality metric 1214 based on the total number of rows marked for deletion for each file across all the partitions and the total number of deleted rows of each data file across all the partitions. In accordance with an embodiment, global fragmentation quality metric 1214 may be generated in accordance with Equation 16 as described above.

In accordance with an embodiment, responsive to determining that the fragmentation of the partitions is suboptimal, index management system 1202 may merge active rows of data files together in an active data file and/or merge rows marked for deletion together in an inactive data file. For example, index management system 1202 may, for the first partition merge active rows of a first data file, that also comprises first rows marked for deletion, of the data files of the first partition with active rows of a second data file, that also comprises second rows marked for deletion, of the data files of the first partition into a first new data file, and merge the first rows of the first data file that are marked for deletion with the second rows of the second data file that are marked for deletion into a second new data file. Index management system 1202 may, for the second partition merge active rows of a first data file, that also comprises first rows marked for deletion, of the data files of the second partition with active rows of a second data file, that also comprises second rows marked for deletion, of the data files of the first partition into a first new data file, and merge the first rows of the first data file that are marked for deletion with the second rows of the second data file that are marked for deletion into a second new data file.

F. Global Quality Metric and Unit of Work Aggregation

Figure 14:
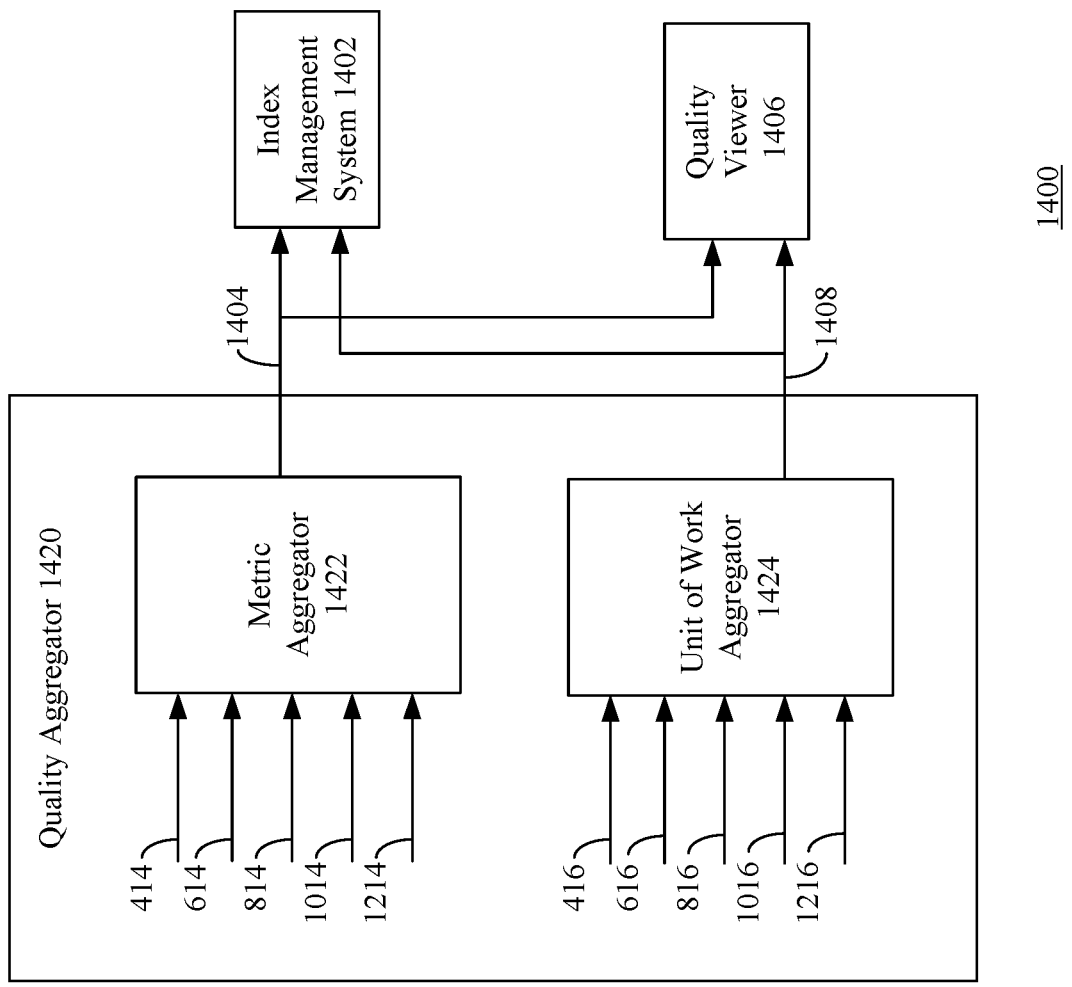
FIG. 14 depicts a block diagram of a system for generating an overall index quality metric and a global unit of work in accordance with an example embodiment.

FIG. 14 depicts a block diagram of a system 1400 for generating an overall index quality metric and a global unit of work in accordance with an example embodiment. As shown in FIG. 14, system 1400 comprises quality aggregator 1420, index management system 1402, and a quality viewer 1406. Quality aggregator 1420, index management system 1402, and quality viewer 1406 are examples of quality aggregator 1220, index management system 1202, and quality viewer 1206, as described above with reference to FIG. 12. Quality aggregator 1420 comprises a metric aggregator 1422 and a unit of work aggregator 1424, which are examples of metric aggregator 1222 and unit of work aggregator 1224, as described above with reference to FIG. 12.

Metric aggregator 1422 is configured to aggregate various global metrics generated by quality aggregator 1420. For instance, metric aggregator 1422 is configured to aggregate global partitioning quality metric 414 (as described above in FIG. 4), global clustering quality metric 614 (as described above in FIG. 6), global data packing quality metric 814 (as described above in FIG. 8), global compaction quality metric 1014 (as described above in FIG. 10), and global fragmentation quality metric 1214 (as described above in FIG. 12) to generate an overall index quality 1404. In accordance with an embodiment, metric aggregator 1422 aggregates such metrics in accordance with Equation 15, which is shown below:

$$IQ = w1*GDPQM + w2*GCQM + w3*GDPQM + w4*GCQM + w5*GFQM \qquad \text{(Equation 17)}$$

In accordance with Equation 17, the overall index quality (IQ) is a weighted sum of each of the induvial global quality metrics (i.e., global partitioning quality metric 414 (GDPQM), global clustering quality metric 614 (GCQM), global data packing quality metric 814 (GDPQM), global compaction quality metric 1014 (GCQM), and global fragmentation quality metric 1214 (GFQM). Because different systems may have different implementations, the weights (i.e., w1, w2, w3, w4, and w5) may be selected in accordance with the specific system in which embodiments described herein are implemented.

Unit of work aggregator 1424 is configured to aggregate various global metrics generated by quality aggregator 1420.

For instance, unit of work aggregator 1424 is configured to aggregate global partitioning unit of work 416 (as described above in FIG. 4), global clustering unit of work 616 (as described above in FIG. 6), global data packing unit of work 816 (as described above in FIG. 8), global compaction unit of work 1016 (as described above in FIG. 10), and global fragmentation unit of work 1216 (as described above in FIG. 12) to generate an aggregated (or overall) unit of work 1408. In accordance with an embodiment, unit of work aggregator 1424 aggregates such units of work in accordance with Equation 18, which is shown below:

$$AUW = GDPUW + GCUW + GDPUW + GCQUW + GFUW \qquad \text{(Equation 18)}$$

In accordance with Equation 18, the overall, aggregated unit of work (AUW) is a sum of each of the induvial global units of work (i.e., global partitioning unit of work 416 (GDPUW), global clustering unit of work 616 (GCUW), global data packing unit of work 816 (GDPUW), global compaction unit of work 1016 (GCUW), and global fragmentation unit of work 1216 (GFUW). Each of the units of work may be weighted in a similar manner as described above with reference to Equation 17. The overall unit of work represents an estimate of the total amount of work index management system 1402 must perform to improve the overall quality of the index. Overall index quality 1404 and aggregated unit of work 1408 are provided to index management system 1402 and/or quality viewer 1406.

Quality viewer 1406 may display, for example, via a GUI, overall index quality 1404 and/or aggregated unit of work 1408. A user of the GUI (e.g., a database administrator) may determine whether a n action should be performed with respect to the database table in order to improve index performance based on overall index quality 1404 and/or aggregated unit of work 108. For example, a user may desire to alter the manner in which the database table is stored. In such an example, the user, using the GUI, may issue a command to index management system 1402 that causes index management system 1402 to perform an action that alters the manner in which the database table is stored. In certain embodiments, in addition to or in lieu of displaying overall index quality 1404 and/or aggregated unit of work 1408, quality viewer 1406 may display each local quality metric and/or unit of work generated therefor individually.

Examples of actions include, but are not limited to, determining a new partitioning key and causing the database table to be partitioned in accordance with the new partitioning key, re-clustering one or more data files of a particular partition, merging data files of a particular partition, compressing uncompressed rows of data files of a particular partition, merging active rows of different data files of a particular partition together, and/or any other action described herein.

Index management system 1402 may be configured to automatically perform an action to improve index performance based on overall index quality 1404 and/or aggregated unit of work 1408. For instance, index management system 1402 may determine whether the overall index quality 1404 meets a condition with respect to a predetermined threshold (for instance, it may determine whether the global quality metric reaches a predetermined threshold). In response to determining that the global quality metric meets a condition with respect to the predetermined threshold, index management system 1402 may perform one or more actions described above to alter a manner in which data is stored by the database table in order to reduce or eliminate the inefficiency (i.e., to improve the index).

For example, index management system 1402 may determine which of the local quality metrics is the lowest and perform an action to improve that particular local quality metric. In another example, index management system 1402 may determine which of the units of work is the lowest and perform an action to improve the corresponding local quality metric. This way, the overhead to remediate the inefficiency will be relatively lower. It is noted that index management system 1402 may utilize other criteria to determine whether or not to perform an action to remediate a particular inefficiency attributed to particular local quality metric.

III. Example Computer System Implementation

The systems and methods described above in reference to FIGS. 1-14, may be implemented in hardware, or hardware combined with one or both of software and/or firmware. For example, system 1500 of FIG. 15 may be used to implement any of nodes 108A-108N, 112A-112N, and/or 114A-114N, storage node(s) 110A-110N, quality aggregator 120, quality generator 118, and/or metadata catalog 104 of FIG. 1, quality viewer 206, quality aggregator 220, index management system 202, quality generators 218A-218N, and/or metadata catalogs 204A-204N of FIG. 2, quality aggregator 420, global partitioning quality metric generator 401, global clustering quality metric generator 401, quality generators 418A-418N, index management system 402, quality viewer 406, metadata receiver 404, statistics generator 405, partitioning quality metric generator 408, partitioning unit of work generator 410, metric aggregator 422, and/or unit of work aggregator 424 of FIG. 4, quality aggregator 620, global data packing quality metric generator 801, quality generators 618A-618N, clustering quality determiners 610A-610N, clustering unit of work determiners 612A-612N, index management system 602, quality viewer 606, global clustering quality metric determiner 604, global clustering unit of work determiner 605, metric aggregator 622, and/or unit of work aggregator 624 of FIG. 6, quality aggregator 820, quality generators 818A-818N, data packing quality determiners 810A-810N, data packing unit of work determiners 812A-812N index management system 802, quality viewer 806, global data packing quality metric determiner 804, global data packing unit of work determiner 805, metric aggregator 822, and/or unit of work aggregator 824 of FIG. 8, quality aggregator 1020, global compaction quality metric generator 1001, quality generators 1018A-1018N, index management system 1002, quality viewer 1006, global compaction quality metric determiner 1004, global compaction unit of work determiner 1005, metric aggregator 1022, and/or unit of work aggregator 1024 of FIG. 10, quality aggregator 1220, global fragmentation quality metric generator 1201, quality generators 1218A-1218N, index management system 1202, quality viewer 1206, global comp fragmentation action quality metric determiner 1204, global fragmentation unit of work determiner 1205, metric aggregator 1222, and/or unit of work aggregator 1224 of FIG. 10, quality aggregator 1420, metric aggregator 1422, unit of work aggregator 1424, index management system 1402, and/or quality viewer 1406 of FIG. 14 and/or any of the components respectively described therein, and flowcharts 300, 500, 700, 900, 1100, and/or 1300 may be each implemented as computer program code/instructions configured to be executed in one or more processors and stored in a computer readable storage medium. Alternatively, any of nodes 108A-108N, 112A-112N, and/or 114A-114N, storage node(s) 110A-110N, quality aggregator 120, quality generator 118, and/or metadata catalog 104 of FIG. 1, quality viewer 206, quality aggregator 220, index management system 202, quality generators 218A-218N, and/or metadata catalogs 204A-204N of FIG. 2, quality aggregator 420, global partitioning quality metric generator 401, global clustering quality metric generator 401, quality generators 418A-418N, index management system 402, quality viewer 406, metadata receiver 404, statistics generator 405, partitioning quality metric generator 408, partitioning unit of work generator 410, metric aggregator 422, and/or unit of work aggregator 424 of FIG. 4, quality aggregator 620, global data packing quality metric generator 801, quality generators 618A-618N, clustering quality determiners 610A-610N, clustering unit of work determiners 612A-612N, index management system 602, quality viewer 606, global clustering quality metric determiner 604, global clustering unit of work determiner 605, metric aggregator 622, and/or unit of work aggregator 624 of FIG. 6, quality aggregator 820, quality generators 818A-818N, data packing quality determiners 810A-810N, data packing unit of work determiners 812A-812N index management system 802, quality viewer 806, global data packing quality metric determiner 804, global data packing unit of work determiner 805, metric aggregator 822, and/or unit of work aggregator 824 of FIG. 8, quality aggregator 1020, global compaction quality metric generator 1001, quality generators 1018A-1018N, index management system 1002, quality viewer 1006, global compaction quality metric determiner 1004, global compaction unit of work determiner 1005, metric aggregator 1022, and/or unit of work aggregator 1024 of FIG. 10, quality aggregator 1220, global fragmentation quality metric generator 1201, quality generators 1218A-1218N, index management system 1202, quality viewer 1206, global comp fragmentation action quality metric determiner 1204, global fragmentation unit of work determiner 1205, metric aggregator 1222, and/or unit of work aggregator 1224 of FIG. 10, quality aggregator 1420, metric aggregator 1422, unit of work aggregator 1424, index management system 1402, and/or quality viewer 1406 of FIG. 14 and/or any of the components respectively described therein, and flowcharts 300, 500, 700, 900, 1100, and/or 1300 may be implemented in one or more SoCs (system on chip). An SoC may include an integrated circuit chip that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 15:
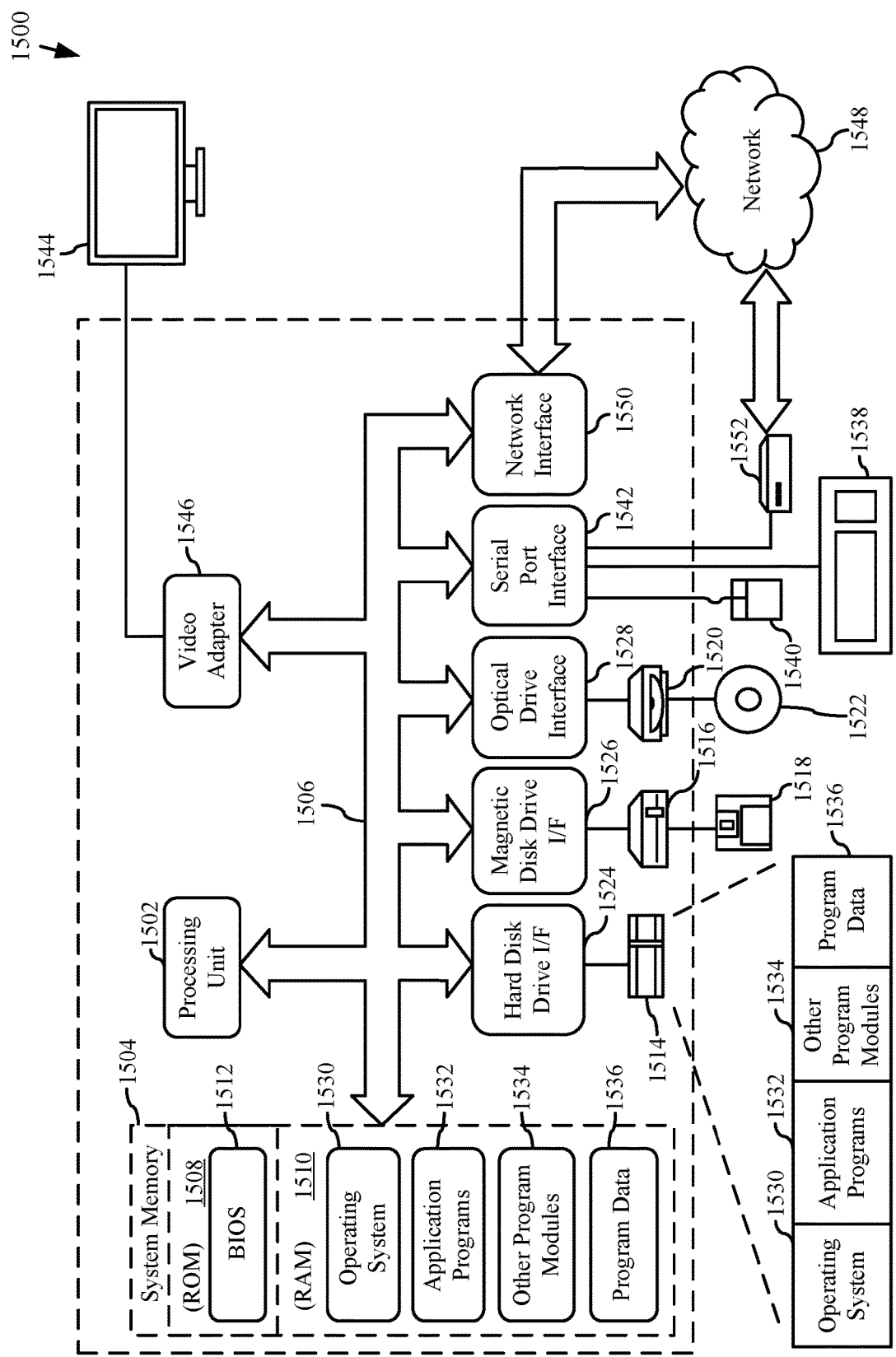
FIG. 15 is a block diagram of an example processor-based computer system that may be used to implement various embodiments.

FIG. 15 depicts an exemplary implementation of a computing device 1500 in which embodiments may be implemented, including any of nodes 108A-108N, 112A-112N, and/or 114A-114N, storage node(s) 110A-110N, quality aggregator 120, quality generator 118, and/or metadata catalog 104 of FIG. 1, quality viewer 206, quality aggregator 220, index management system 202, quality generators 218A-218N, and/or metadata catalogs 204A-204N of FIG. 2, quality aggregator 420, global partitioning quality metric generator 401, global clustering quality metric generator 401, quality generators 418A-418N, index management system 402, quality viewer 406, metadata receiver 404, statistics generator 405, partitioning quality metric generator 408, partitioning unit of work generator 410, metric aggregator 422, and/or unit of work aggregator 424 of FIG. 4, quality aggregator 620, global data packing quality metric generator 801, quality generators 618A-618N, clustering quality determiners 610A-610N, clustering unit of work determiners 612A-612N, index management system 602, quality viewer 606, global clustering quality metric determiner 604, global clustering unit of work determiner 605, metric aggregator 622, and/or unit of work aggregator 624 of FIG. 6, quality aggregator 820, quality generators 818A-818N, data packing quality determiners 810A-810N, data packing unit of work determiners 812A-812N index management system 802, quality viewer 806, global data packing quality metric determiner 804, global data packing unit of work determiner 805, metric aggregator 822, and/or unit of work aggregator 824 of FIG. 8, quality aggregator 1020, global compaction quality metric generator 1001, quality generators 1018A-1018N, index management system 1002, quality viewer 1006, global compaction quality metric determiner 1004, global compaction unit of work determiner 1005, metric aggregator 1022, and/or unit of work aggregator 1024 of FIG. 10, quality aggregator 1220, global fragmentation quality metric generator 1201, quality generators 1218A-1218N, index management system 1202, quality viewer 1206, global comp fragmentation action quality metric determiner 1204, global fragmentation unit of work determiner 1205, metric aggregator 1222, and/or unit of work aggregator 1224 of FIG. 10, quality aggregator 1420, metric aggregator 1422, unit of work aggregator 1424, index management system 1402, and/or quality viewer 1406 of FIG. 14 and/or any of the components respectively described therein, and flowcharts 300, 500, 700, 900, 1100, and/or 1300. The description of computing device 1500 provided herein is provided for purposes of illustration, and is not intended to be limiting. Embodiments may be implemented in further types of computer systems, as would be known to persons skilled in the relevant art(s).

As shown in FIG. 15, computing device 1500 includes one or more processors, referred to as processor circuit 1502, a system memory 1504, and a bus 1506 that couples various system components including system memory 1504 to processor circuit 1502. Processor circuit 1502 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor circuit 1502 may execute program code stored in a computer readable medium, such as program code of operating system 1530, application programs 1532, other programs 1534, etc. Bus 1506 represents one or more of any of several types of bus structures, including a memory bus or memory controller, a peripheral bus, an accelerated graphics port, and a processor or local bus using any of a variety of bus architectures. System memory 1504 includes read only memory (ROM) 1508 and random access memory (RAM) 1510. A basic input/output system 1512 (BIOS) is stored in ROM 1508.

Computing device 1500 also has one or more of the following drives: a hard disk drive 1514 for reading from and writing to a hard disk, a magnetic disk drive 1516 for reading from or writing to a removable magnetic disk 1518, and an optical disk drive 1520 for reading from or writing to a removable optical disk 1522 such as a CD ROM, DVD ROM, or other optical media. Hard disk drive 1514, magnetic disk drive 1516, and optical disk drive 1520 are connected to bus 1506 by a hard disk drive interface 1524, a magnetic disk drive interface 1526, and an optical drive interface 1528, respectively. The drives and their associated computer-readable media provide nonvolatile storage of computer-readable instructions, data structures, program modules and other data for the computer. Although a hard disk, a removable magnetic disk and a removable optical disk are described, other types of hardware-based computer-readable storage media can be used to store data, such as flash memory cards, digital video disks, RAMs, ROMs, and other hardware storage media.

A number of program modules may be stored on the hard disk, magnetic disk, optical disk, ROM, or RAM. These programs include operating system 1530, one or more application programs 1532, other programs 1534, and program data 1536. Application programs 1532 or other programs 1534 may include, for example, computer program logic (e.g., computer program code or instructions) for implementing the systems described above, including the embodiments described above with reference to FIGS. 1-14.

A user may enter commands and information into the computing device 1500 through input devices such as keyboard 1538 and pointing device 1540. Other input devices (not shown) may include a microphone, joystick, game pad, satellite dish, scanner, a touch screen and/or touch pad, a voice recognition system to receive voice input, a gesture recognition system to receive gesture input, or the like. These and other input devices are often connected to processor circuit 1502 through a serial port interface 1542 that is coupled to bus 1506, but may be connected by other interfaces, such as a parallel port, game port, or a universal serial bus (USB).

A display screen 1544 is also connected to bus 1506 via an interface, such as a video adapter 1546. Display screen 1544 may be external to, or incorporated in computing device 1500. Display screen 1544 may display information, as well as being a user interface for receiving user commands and/or other information (e.g., by touch, finger gestures, a virtual keyboard, by providing a tap input (where a user lightly presses and quickly releases display screen 1544), by providing a "touch-and-hold" input (where a user touches and holds his finger (or touch instrument) on display screen 1544 for a predetermined period of time), by providing touch input that exceeds a predetermined pressure threshold, etc.). In addition to display screen 1544, computing device 1500 may include other peripheral output devices (not shown) such as speakers and printers.

Computing device 1500 is connected to a network 1548 (e.g., the Internet) through an adaptor or network interface 1550, a modem 1552, or other means for establishing communications over the network. Modem 1552, which may be internal or external, may be connected to bus 1506 via serial port interface 1542, as shown in FIG. 15, or may be connected to bus 1506 using another interface type, including a parallel interface.

As used herein, the terms "computer program medium," "computer-readable medium," and "computer-readable storage medium" are used to generally refer to physical hardware media such as the hard disk associated with hard disk drive 1514, removable magnetic disk 1518, removable optical disk 1522, other physical hardware media such as RAMs, ROMs, flash memory cards, digital video disks, zip disks, MEMs, nanotechnology-based storage devices, and further types of physical/tangible hardware storage media (including system memory 1504 of FIG. 15). Such computer-readable storage media are distinguished from and non-overlapping with communication media (do not include communication media). Communication media typically embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments are also directed to such communication media.

As noted above, computer programs and modules (including application programs 1532 and other programs 1534) may be stored on the hard disk, magnetic disk, optical disk, ROM, RAM, or other hardware storage medium. Such computer programs may also be received via network interface 1550, serial port interface 1552, or any other interface type. Such computer programs, when executed or loaded by an application, enable computing device 1500 to implement features of embodiments discussed herein. Accordingly, such computer programs represent controllers of the computing device 1500.

Embodiments are also directed to computer program products comprising computer code or instructions stored on any computer-readable medium. Such computer program products include hard disk drives, optical disk drives, memory device packages, portable memory sticks, memory cards, and other types of physical storage hardware.

IV. Further Example Embodiments

A method is described herein. The method includes: receiving, from a first compute node via a network, a first quality metric for a first partition of a database table maintained by a distributed database system, the first quality metric indicative of a quality of a first property of the first partition; receiving, from a second compute node via the network, a second quality metric for a second partition of the database table, the second quality metric indicative of a quality of a second property of the second partition; generating a global quality metric that is indicative of the performance of an index of the distributed database system based at least on the first quality metric and the second quality metric; detecting an inefficiency with respect to the index based on the global quality metric meeting a condition with respect to a predetermined threshold; and in response to detecting the inefficiency, performing an action to alter a manner in which data is stored by the database table.

In one implementation of the foregoing method, the first quality metric comprises a number of rows of the first partition, the second quality metric comprises a number of rows of the second partition, and said generating the global quality metric comprises: analyzing at least the first quality metric and the second quality metric to determine whether at least a distribution of the rows of the first partition and the rows of the second partition meets a condition with respect to a second predetermined threshold; responsive to determining that at least the distribution of the rows of the first partition and the rows of the second partition meets the condition with respect to the second predetermined threshold, maintaining a partitioning key on which at least the first partition and the second partition is based; and responsive to determining that at least the distribution of the rows of the first partition and the rows of the second partition does not meet the condition with respect to the second predetermined threshold, determining a different partitioning key for at least the first partition and the second partition.

In one implementation of the foregoing method, said performing the action to alter the manner in which data is stored by the database table comprises partitioning the database table in accordance with the different partitioning key.

In one implementation of the foregoing method, the first quality metric comprises a first data clustering quality metric that is based at least on a first overlap value that indicates a maximum number of data files of the first partition that include a row having a particular value of a particular clustering key of first multiple clustering keys, and the second quality metric comprises a second data clustering quality metric that is based at least on a second overlap value that indicates a maximum number of data files of the second partition that include a row having a particular value for a particular clustering key of second multiple clustering keys, and said generating the global quality metric comprises: determining a greatest data clustering quality metric from among at least the first data clustering quality metric and the second data clustering quality metric; in response to determining that the first data clustering quality metric is the greatest data clustering quality metric, designating the first data clustering quality metric as a global data clustering quality metric; and in response to determining that the second data clustering quality metric is the greatest data clustering quality metric, designating the second data clustering quality metric as the global data clustering quality metric.

In one implementation of the foregoing method, said performing the action to alter the manner in which data is stored by the database table comprises: in response to determining that the first data clustering quality metric is the greatest data clustering quality metric, re-clustering at least a subset of the data files of the first partition that store rows having values for the first multiple clustering keys such that at least the subset of the data files of the first partition store rows having values for a single clustering key of the first multiple clustering keys; and in response to determining that the second data clustering quality metric is the greatest data clustering quality metric, re-clustering at least a subset of the data files of the second partition that store rows having values for the second multiple clustering keys such that at least the subset of the data files of the second partition store rows having values for a single clustering key of the second multiple clustering keys.

In one implementation of the foregoing method, the first quality metric comprises a first data packing quality metric that is based on a first average file quality of data files of the first partition, the first average file quality being based on a number of rows stored by each of the data files of the first partition and a predetermined ideal row count parameter; the second quality metric comprises a second data packing quality metric that is based on a second average file quality of data files of the second partition, the second average file quality being based on a number of rows stored by each of the data files of the second partition and the predetermined ideal row count parameter, and said generating the global quality metric comprises: generating a global data packing quality metric based at least on the first data packing metric and the second data packing metric.

In one implementation of the foregoing method, said performing the action to alter the manner in which data is stored by the database table comprises: performing at least one of: merging two or more data files of the data files of the first partition each having a number of rows that is less than the predetermined ideal row count parameter; or merging two or more data files of the data files of the second partition each having a number of rows that is less than the predetermined ideal row count parameter.

In one implementation of the foregoing method, the first quality metric comprises a first compaction quality metric that is based on a number of uncompressed rows maintained by data files of the first partition, and the second quality metric comprises a second compaction quality metric that is based on a number of uncompressed rows maintained by data files of the second partition, and said generating the global quality metric comprises: generating a global compaction quality metric based at least on a combination of the first compaction quality metric and the second compaction quality metric and a predetermined compression threshold parameter.

In one implementation of the foregoing method, said performing the action to alter the manner in which data is stored by the database table comprises: performing at least one of: compressing the uncompressed rows of the data files maintained by the first partition; or compressing the uncompressed rows of the data files maintained by the second partition.

In one implementation of the foregoing method, the first quality metric comprises a first fragmentation quality metric that is based on a number of rows that are marked for deletion in data files of the first partition, and the second quality metric comprises a second fragmentation quality metric that is based on a number of rows marked for deletion in data files of the second partition, and said generating the global quality metric comprises: generating a global fragmentation quality metric based at least on a combination of the first fragmentation quality metric and the second fragmentation quality metric and a total number of rows in the first partition and the second partition.

In one implementation of the foregoing method, said performing the action to alter the manner in which data is stored by the database table comprises: performing at least one of: merging active rows of a first data file, that also comprises first rows marked for deletion, of the data files of the first partition with active rows of a second data file, that also comprises second rows marked for deletion, of the data files of the first partition into a first new data file, and merging the first rows of the first data file that are marked for deletion with the second rows of the second data file that are marked for deletion into a second new data file; or merging active rows of a third data file, that also comprises third rows marked for deletion, of the data files of the second partition with active rows of a fourth data file, that also comprises fourth rows marked for deletion, of the data files of the second partition into a third new data file, and merging the third rows of the third data file that are marked for deletion with the fourth rows of the fourth data file that are marked for deletion into a fourth new data file.

A system in accordance with any of the embodiments described herein is also disclosed. The system includes: at least one processor circuit; and at least one memory that stores program code configured to be executed by the at least one processor circuit, the program code comprising: a quality aggregator configured to: receive, from a first compute node via a network, a first quality metric for a first partition of a database table maintained by a distributed database system, the first quality metric indicative of a quality of a first property of the first partition; receive, from a second compute node via the network, a second quality metric for a second partition of the database table, the second quality metric indicative of a quality of a second property of the second partition; and generate a global quality metric that is indicative of the performance of an index of the distributed database system based at least on the first quality metric and the second quality metric; and an index management system configured to: detect an inefficiency with respect to the index based on the global quality metric meeting a condition with respect to a predetermined threshold; and in response to detecting the inefficiency, perform an action to alter a manner in which data is stored by the database table.

In one implementation of the foregoing system, the first quality metric comprises a number of rows of the first partition, wherein the second quality metric comprises a number of rows of the second partition, and wherein the quality aggregator is configured to generate the global quality metric by: analyzing at least the first quality metric and the second quality metric to determine whether at least a distribution of the rows of the first partition and the rows of the second partition meets a condition with respect to a second predetermined threshold; responsive to determining that at least the distribution of the rows of the first partition and the rows of the second partition meets the condition with respect to the second predetermined threshold, maintaining a partitioning key on which at least the first partition and the second partition is based; and responsive to determining that at least the distribution of the rows of the first partition and the rows of the second partition does not meet the condition with respect to the second predetermined threshold, determining a different partitioning key for at least the first partition and the second partition.

In one implementation of the foregoing system, the index management system is further configured to: partition the database table in accordance with the different partitioning key.

In one implementation of the foregoing system, the first quality metric comprises a first data clustering quality metric that is based at least on a first overlap value that indicates a maximum number of data files of the first partition that include a row having a particular value of a particular clustering key of first multiple clustering keys, and the second quality metric comprises a second data clustering quality metric that is based at least on a second overlap value that indicates a maximum number of data files of the second partition that include a row having a particular value for a particular clustering key of second multiple clustering keys, and the quality aggregator is configured to generate the global quality metric by: determining a greatest data clustering quality metric from among at least the first data clustering quality metric and the second data clustering quality metric; in response to determining that the first data clustering quality metric is the greatest data clustering quality metric, designating the first data clustering quality metric as a global data clustering quality metric; and in response to determining that the second data clustering quality metric is the greatest data clustering quality metric, designating the second data clustering quality metric as the global data clustering quality metric.

In one implementation of the foregoing system, the index management system is further configured to: in response to determining that the first data clustering quality metric is the greatest data clustering quality metric, re-cluster at least a subset of the data files of the first partition that store rows having values for the first multiple clustering keys such that at least the subset of the data files of the first partition store rows having values for a single clustering key of the first multiple clustering keys; and in response to determining that the second data clustering quality metric is the greatest data clustering quality metric, re-cluster at least a subset of the data files of the second partition that store rows having values for the second multiple clustering keys such that at least the subset of the data files of the second partition store rows having values for a single clustering key of the second multiple clustering keys.

In one implementation of the foregoing system, the first quality metric comprises a first data packing quality metric that is based on a first average file quality of data files of the first partition, the first average file quality being based on a number of rows stored by each of the data files of the first partition and a predetermined ideal row count parameter; the second quality metric comprises a second data packing quality metric that is based on a second average file quality of data files of the second partition, the second average file quality being based on a number of rows stored by each of the data files of the second partition and the predetermined ideal row count parameter, and the quality aggregator is configured to generate the global quality metric by: generating a global data packing quality metric based at least on the first data packing metric and the second data packing metric.

In one implementation of the foregoing system, the index management system is further configured to: perform at least one of: merge two or more data files of the data files of the first partition each having a number of rows that is less than the predetermined ideal row count parameter; or merge two or more data files of the data files of the second partition each having a number of rows that is less than the predetermined ideal row count parameter.

In one implementation of the foregoing system, the first quality metric comprises a first compaction quality metric that is based on a number of uncompressed rows maintained by data files of the first partition, and the second quality metric comprises a second compaction quality metric that is based on a number of uncompressed rows maintained by data files of the second partition, and the quality aggregator is configured to generate the global quality metric by: generating a global compaction quality metric based at least on a combination of the first compaction quality metric and the second compaction quality metric and a predetermined compression threshold parameter.

A computer-readable storage medium having program instructions recorded thereon that, when executed by at least one processor, perform a method for consistency checking of data objects that represent a table. The method includes: receiving, from a first compute node via a network, a first quality metric for a first partition of a database table maintained by a distributed database system, the first quality metric indicative of a quality of a first property of the first partition; receiving, from a second compute node via the network, a second quality metric for a second partition of the database table, the second quality metric indicative of a quality of a second property of the second partition; generating a global quality metric that is indicative of the performance of an index of the distributed database system based at least on the first quality metric and the second quality metric; detecting an inefficiency with respect to the index based on the global quality metric meeting a condition with respect to a predetermined threshold; and in response to detecting the inefficiency, performing an action to alter a manner in which data is stored by the database table.

V Conclusion

While various example embodiments have been described above, it should be understood that they have been presented by way of example only, and not limitation. It will be understood by those skilled in the relevant art(s) that various changes in form and details may be made therein without departing from the spirit and scope of the embodiments as defined in the appended claims. Accordingly, the breadth and scope of the disclosure should not be limited by any of the above-described example embodiments, but should be defined only in accordance with the following claims and their equivalents.

What is claimed is:

1. A method, comprising:
receiving, from a first compute node via a network, a first quality metric for a first partition of a database table maintained by a distributed database system, the first quality metric-comprising a first data clustering quality metric that is based at least on a first overlap value that indicates a maximum number of data files of the first partition that include a row having a particular value of a particular clustering key of first multiple clustering keys;

receiving, from a second compute node via the network, a second quality metric for a second partition of the database table, the second quality metric comprising a second data clustering quality metric that is based at least on a second overlap value that indicates a maximum number of data files of the second partition that include a row having a particular value for a particular clustering key of second multiple clustering keys;

determining a greatest data clustering quality metric from among at least the first data clustering quality metric and the second data clustering quality metric;

in response to determining that the first data clustering quality metric is the greatest data clustering quality metric, designating the first data clustering quality metric as a global data clustering quality metric that is indicative of the performance of an index of the distributed database system;

in response to determining that the second data clustering quality metric is the greatest data clustering quality metric, designating the second data clustering quality metric as the global data clustering quality metric;

detecting an inefficiency with respect to the index based on the global data clustering quality metric meeting a condition with respect to a predetermined threshold; and in response to detecting the inefficiency, performing an action to alter a manner in which data is stored by the database table.

2. The method of claim 1, wherein said performing the action to alter the manner in which data is stored by the database table comprises:

in response to determining that the first data clustering quality metric is the greatest data clustering quality metric, re-clustering at least a subset of the data files of the first partition that store rows having values for the first multiple clustering keys such that at least the subset of the data files of the first partition store rows having values for a single clustering key of the first multiple clustering keys; and in response to determining that the second data clustering quality metric is the greatest data clustering quality metric, re-clustering at least a subset of the data files of the second partition that store rows having values for the second multiple clustering keys such that at least the subset of the data files of the second partition store rows having values for a single clustering key of the second multiple clustering keys.

3. The method of claim 1, wherein the method further comprises:

determining a first unit of work required to improve the first data clustering quality metric;

determining a second unit of work required to improve the second data clustering quality metric; and wherein said performing the action to alter the manner in which data is stored by the database table is performed based on the first unit of work and the second unit of work.

4. The method of claim 3, wherein said performing the action to alter the manner in which data is stored by the database table comprises:

comparing the first unit of work to the second unit of work;

performing the action to improve the first data clustering quality metric when it is determined that the first unit of work is less than the second unit of work; and performing the action to improve the second data clustering quality metric when it is determined that the second unit of work is less than the first unit of work.

5. The method of claim 3, wherein said performing the action to alter the manner in which data is stored by the database table comprises:

generating a global unit of work by aggregating the first unit of work to the second unit of work; and performing the action based on the global unit of work.

6. A system, comprising:

at least one processor circuit; and at least one memory that stores program code configured to be executed by the at least one processor circuit, the program code comprising:

a quality aggregator configured to:

receive, from a first compute node via a network, a first quality metric for a first partition of a database table maintained by a distributed database system, the first quality metric comprising a first data packing quality metric that is based on a first average file quality of data files of the first partition, the first average file quality being based on a number of rows stored by each of the data files of the first partition and a predetermined ideal row count parameter;

receive, from a second compute node via the network, a second quality metric for a second partition of the database table, the second quality metric comprising a second data packing quality metric that is based on a second average file quality of data files of the second partition, the second average file quality being based on a number of rows stored by each of the data files of the second partition and the predetermined ideal row count parameter; and generate a global data packing quality metric that is indicative of the performance of an index of the distributed database system based at least on the first data packing quality metric and the second data packing quality metric; and an index management system configured to:

detect an inefficiency with respect to the index based on the global data packing quality metric meeting a condition with respect to a predetermined threshold; and in response to detecting the inefficiency, perform an action to alter a manner in which data is stored by the database table.

7. The system of claim 6, wherein the index management system is further configured to:

perform at least one of:

merge two or more data files of the data files of the first partition each having a number of rows that is less than the predetermined ideal row count parameter; or merge two or more data files of the data files of the second partition each having a number of rows that is less than the predetermined ideal row count parameter.

8. The system of claim 6, wherein the quality aggregator is further configured to:

determine a first unit of work required to improve the first data packing quality metric;

determine a second unit of work required to improve the second data packing quality metric; and wherein said performing the action to alter the manner in which data is stored by the database table is performed based on the first unit of work and the second unit of work.

9. The system of claim 8, wherein said performing the action to alter the manner in which data is stored by the database table comprises:
   comparing the first unit of work to the second unit of work;
   performing the action to improve the first packing quality metric when it is determined that the first unit of work is less than the second unit of work; and
   performing the action to improve the second packing quality metric when it is determined that the second unit of work is less than the first unit of work.

10. The system of claim 8, wherein the quality aggregator is further configured to:
    generate a global unit of work by aggregating the first unit of work to the second unit of work; and
    wherein said performing the action to alter the manner in which data is stored by the database table is performed based on the global unit of work.

11. A computer-readable storage medium having program instructions recorded thereon that, when executed by at least one processor of a computing device, perform a method, the method comprising:
    receiving, from a first compute node via a network, a first quality metric for a first partition of a database table maintained by a distributed database system, the first quality metric comprising a first compaction quality metric that is based on a number of uncompressed rows maintained by data files of the first partition;
    receiving, from a second compute node via the network, a second quality metric for a second partition of the database table, the second quality metric comprising a second compaction quality metric that is based on a number of uncompressed rows maintained by data files of the second partition;
    generating a global compaction quality metric that is indicative of the performance of an index of the distributed database system based at least on the first compaction quality metric and the second compaction quality metric and a predetermined compression threshold parameter;
    detecting an inefficiency with respect to the index based on the global compaction quality metric meeting a condition with respect to a predetermined threshold; and
    in response to detecting the inefficiency, performing an action to alter a manner in which data is stored by the database table.

12. The computer-readable storage medium of claim 11, wherein said performing the action to alter the manner in which data is stored by the database table comprises:
    performing at least one of:
      compressing the uncompressed rows of the data files maintained by the first partition; or
      compressing the uncompressed rows of the data files maintained by the second partition.

13. The computer-readable storage medium of claim 11, wherein the method further comprises:
    determining a first unit of work required to improve the first compaction quality metric;
    determining a second unit of work required to improve the second compaction quality metric; and
    wherein said performing the action to alter the manner in which data is stored by the database table is performed based on the first unit of work and the second unit of work.

14. The computer-readable storage medium of claim 13, wherein said performing the action to alter the manner in which data is stored by the database table comprises:
    comparing the first unit of work to the second unit of work;
    performing the action to improve the first compaction quality metric when it is determined that the first unit of work is less than the second unit of work; and
    performing the action to improve the second compaction quality metric when it is determined that the second unit of work is less than the first unit of work.

15. The computer-readable storage medium of claim 13, wherein said performing the action to alter the manner in which data is stored by the database table comprises:
    generating a global unit of work by aggregating the first unit of work to the second unit of work; and
    performing the action based on the global unit of work.

16. A method, comprising:
    receiving, from a first compute node via a network, a first quality metric for a first partition of a database table maintained by a distributed database system, the first quality metric comprising a first fragmentation quality metric that is based on a number of rows that are marked for deletion in data files of the first partition;
    receiving, from a second compute node via the network, a second quality metric for a second partition of the database table, the second quality metric comprising a second fragmentation quality metric that is based on a number of rows marked for deletion in data files of the second partition;
    generating a global fragmentation quality metric that is indicative of the performance of an index of the distributed database system based at least on a combination of the first fragmentation quality metric and the second fragmentation quality metric and a total number of rows in the first partition and the second partition;
    detecting an inefficiency with respect to the index based on the global fragmentation quality metric meeting a condition with respect to a predetermined threshold; and
    in response to detecting the inefficiency, performing an action to alter a manner in which data is stored by the database table.

17. The method of claim 16, said performing the action to alter the manner in which data is stored by the database table comprises:
    performing at least one of:
      merging active rows of a first data file, that also comprises first rows marked for deletion, of the data files of the first partition with active rows of a second data file, that also comprises second rows marked for deletion, of the data files of the first partition into a first new data file, and
      merging the first rows of the first data file that are marked for deletion with the second rows of the second data file that are marked for deletion into a second new data file; or
      merging active rows of a third data file, that also comprises third rows marked for deletion, of the data files of the second partition with active rows of a fourth data file, that also comprises fourth rows marked for deletion, of the data files of the second partition into a third new data file, and merging the third rows of the third data file that are marked for deletion with the fourth rows of the fourth data file that are marked for deletion into a fourth new data file.

18. The method of claim 16, wherein the method further comprises:
   determining a first unit of work required to improve the first fragmentation quality metric;
   determining a second unit of work required to improve the second fragmentation quality metric; and
   wherein said performing the action to alter the manner in which data is stored by the database table is performed based on the first unit of work and the second unit of work.

19. The method of claim 18, wherein said performing the action to alter the manner in which data is stored by the database table comprises:
   comparing the first unit of work to the second unit of work;
   performing the action to improve the first fragmentation quality metric when it is determined that the first unit of work is less than the second unit of work; and
   performing the action to improve the second fragmentation quality metric when it is determined that the second unit of work is less than the first unit of work.

20. The method of claim 18, wherein said performing the action to alter the manner in which data is stored by the database table comprises:
   generating a global unit of work by aggregating the first unit of work to the second unit of work; and
   performing the action based on the global unit of work.

\* \* \* \* \*